United States Patent [19]

Narazaki et al.

[11] Patent Number: 5,576,086
[45] Date of Patent: Nov. 19, 1996

[54] DEFORMATION-FREE MOLDED ARTICLE

[75] Inventors: Norio Narazaki; Yoshihiro Kayano; Yuko Itagaki, all of Hiratsuka; Ryoji Ukaji, Isehara, all of Japan

[73] Assignees: Mitsubishi Gas Chemical Company, Inc.; Ichikoh Industries, Ltd., both of Tokyo, Japan

[21] Appl. No.: 353,259

[22] Filed: Dec. 2, 1994

Related U.S. Application Data

[63] Continuation of Ser. No. 974,499, Nov. 12, 1992, abandoned.

[30] Foreign Application Priority Data

Dec. 19, 1991 [JP] Japan ................................ 3-336758
Dec. 19, 1991 [JP] Japan ................................ 3-336759
Dec. 19, 1991 [JP] Japan ................................ 3-336760
Dec. 19, 1991 [JP] Japan ................................ 3-354612

[51] Int. Cl.$^6$ ........................ B29D 31/00; B29D 11/00
[52] U.S. Cl. ..................... 428/131; 428/167; 428/156; 428/338; 428/220; 428/119; 428/122; 248/300; 248/475.1; 359/844; 359/871; 264/237; 264/328.14; 264/348
[58] Field of Search ..................... 428/167, 156, 428/338, 220, 131, 119, 122; 248/300, 475.1; 359/844, 871; 264/237, 328.14, 348

[56] References Cited

U.S. PATENT DOCUMENTS

| | | | |
|---|---|---|---|
| 2,102,936 | 12/1937 | Bailey | 428/122 |
| 3,190,600 | 6/1965 | Stanley | 248/300 |
| 3,493,202 | 2/1970 | Jensen | 248/300 |
| 4,523,735 | 6/1985 | Beck et al. | 248/475.1 |
| 4,732,358 | 3/1988 | Hughes et al. | 248/243 |
| 4,789,232 | 12/1988 | Urbanek | 248/475.1 |
| 4,830,898 | 5/1989 | Smith | 428/122 |
| 4,856,746 | 8/1989 | Wrobel et al. | 248/250 |
| 5,005,797 | 4/1991 | Maekawa et al. | 248/479 |
| 5,064,162 | 11/1991 | Jondelius | 248/300 |
| 5,198,938 | 3/1993 | Ward | 359/871 |
| 5,268,795 | 12/1993 | Usami | 248/475.1 |

FOREIGN PATENT DOCUMENTS

| | | | |
|---|---|---|---|
| 2328419 | 1/1975 | Germany | E04B 1/348 |
| 3831274 | 3/1989 | Germany | B29C 45/26 |
| 64-11219 | 1/1989 | Japan . | |
| 64-11220 | 1/1989 | Japan . | |
| 2-41081 | 11/1990 | Japan . | |
| 3-159717 | 7/1991 | Japan . | |
| 2097713 | 11/1982 | United Kingdom | B29D 31/00 |
| 2209702 | 5/1989 | United Kingdom | B29D 31/00 |

OTHER PUBLICATIONS

Kunststoffe, vol. 81, No. 10, Oct. 1991, Muenchen, De, pp. 880–885; Stitz, 'Sind Schwindung und Verzug berechenbar geworden?'.

*Primary Examiner*—William Watkins
*Attorney, Agent, or Firm*—Wenderoth, Lind & Ponack

[57] ABSTRACT

A molded article is formed of a thermoplastic or thermosetting resin and has two planes joining each other in a junction portion; at least one of the two planes has an opening portion or a thin wall portion in the vicinity of the junction portion in order to decrease warpage of the molded article.

3 Claims, 22 Drawing Sheets

DEFORMATION-FREE MOLDED ARTICLE

This application is a Rule 62 Continuation of now abandoned application, Ser. No. 07/974,499, filed Nov. 12, 1992.

BACKGROUND OF THE INVENTION AND RELATED ART

The present invention relates to molded articles which are almost free of deformation, i.e., warpage and bending, and are formed of a thermoplastic resin or a thermosetting resin. The molded articles include an automobile door mirror stay, an automobile door glass holder, a housing, an IC box and a chassis of a copying machine. These molded articles have at least two planes which form a constant angle. These two planes join each other in a junction portion, and the junction portion may be chamfered.

A variety of molded articles are produced from polymer materials or composite materials containing polymers as a matrix (hereinafter simply referred to as "raw materials" in some cases) by means of an injection molding machine or a compression molding machine. Most of these molded articles have at least one combination of two planes which join each other in a junction portion. These planes have the constitution of a flat surface and/or a curved surface. Two planes which join each other show deformation such as warpage and bending (hereinafter simply referred to as "deformation" in some cases) during molding, and there are many cases where molded articles no longer satisfy a dimensional standard.

The form of two planes which join each other in a junction portion and/or the angle formed by the two planes is determined by the forms of cavity wall surfaces of a mold used with an injection molding machine or a compression molding machine and/or an angle formed by the cavity wall surfaces. Actually, however, molded articles show warpage or bending due to the contraction of raw materials when produced and other causes. That is, there is caused a difference between a molded article expected from the form of a mold cavity and a molded article actually produced with the mold cavity. This difference is referred to as warpage or bending.

FIG. 26 shows a state of the above difference. That is, FIG. 26 is a schematic cross-sectional view of a molded article in which two planes 10 and 12 join each other in a junction portion 14 A dotted line shows a designed cross-sectional form, and a solid line shows the cross sectional form of a molded article. The cross-sectional form of the molded article deviates from the designed cross-sectional form due to warpage or bending.

It is considered that the deformation is caused by cooling and solidification in a molding process when the raw material is a thermoplastic resin, and that it is caused by a chemical change in the molding process when the raw material is a thermosetting resin. For avoiding the deformation, the following methods (A) to (C) have been conventionally employed:

(A) a method using a raw material whose shrinkage factor in a molding process is small;

(B) a method in which the radius of curvature of a junction portion is increased so that the shrinkage stress and strain in junction portion decreases during molding; and (C) a method in which a molded article has a rib to prevent warpage and bending.

However, method (A) cannot be applied in some cases for the following reasons.

(a) A raw material is required to have a high elastic modulus and high strength in many cases.

(b) The cost of a raw material is required to be decreased in many cases from the economic viewpoint.

Further, in many cases, the method (B) or (C), if used alone, is not sufficient to effectively decrease deformation such as warpage and bending.

For example, JP-A-64-11219 discloses a rotary polygon mirror for use in an optical apparatus having a laser scanning system. This rotary polygon mirror is formed of a plurality of mirror face portions 11, a boss portion 13, plate-like portions 14 connecting the mirror face portions and the boss portion and a plurality of rib portions 15 extending perpendicularly from in-plane areas of the plate-like portions and connecting the mirror face portions and the boss portion. This rotary polygon mirror is molded by injecting a resin material through a plurality of pinpoint gates 20. Hole portions 30 are formed in junctions where the mirror face portions 11 and the rib portions 15 in the plate-like portions 14 join.

Each of the hole portions 30 functions to overcome the fluctuation of a weldline position. That is, the hole portions are formed to control the flow direction (melt front) of a molten resin injected through the pinpoint gates 20 and to control the molding pressure of a resin material acting on the mirror face portions 11 and junction portions 11A of the mirror face portions 11. Due to the above hole portions 30, the weldline can be positioned in the mirror face portions 11, particularly in the junction portion 11A of each mirror face portion 11 even if the pressures of injection from neighboring pinpoint gates 20 vary to some extent. Since, however, these hole portions 30 are not positioned in the vicinity of junctions where the mirror face portions 11 and the plate-like portions 14 join, the hole portions 30 do not serve to prevent the deformation of each of the mirror face portions 11 and the plate-like portions 14.

JP-A-64-11220 also discloses a rotary polygon mirror for use in an optical apparatus having a laser scanning system. This rotary polygon mirror 10 is formed of a plurality of mirror face portions 11, a boss portion 13, plate-like portions 14 connecting the mirror face portions and the boss portion, and a plurality of rib portions 15 extending perpendicularly from in-plane areas of the plate-like portions and connecting the mirror face portions and the boss portion. This rotary polygon mirror is produced by injection-molding a resin material through pinpoint gates 20.

The thickness of each mirror face portion 11 gradually increases from the central portion to end portions. When each mirror face portion 11 is provided with a thickness which gradually increases or decreases as above, the molding pressure can be uniformly applied to any position of each mirror face portion, whereby the mirror face portions are improved in plane accuracy.

However, no thin wall portions are formed in the vicinity of junctions where the mirror face portions 11 and the plate-like portions 14 join. The above gradual increase or decrease in the thickness of each mirror face portion 11 does not serve to prevent the deformation of each of the mirror face portions 11 and the plate-like portions 14.

JP-A-3-159717 discloses an optical reflection mirror formed of a synthetic resin, which has two planes joining each other to form an angle. This optical reflection mirror is provided with a reinforcing wall for the reinforcement of a corner formed by the two planes. However, no means are disclosed of modifying the planes per se for preventing the deformation of these two planes, e.g., providing the planes with an opening portion or with a thin wall portion.

Japanese Utility Model Publication No. 2-41081 discloses an automobile door mirror produced by aluminum die casting. In this door mirror, a reinforcing partition wall 6a or 60a formed in a base 20 is provided with a securing hole 9 or securing holes 9a and 9b, and a harness 5 is held through the securing hole(s).

However, the above publication describes nothing concerning the prevention of the deformation by forming an opening portion or a thin wall portion in the vicinity of a junction where the base 20 and the reinforcing partition wall 6a or 60a join.

OBJECT AND SUMMARY OF THE INVENTION

It is an object of the present invention to provide molded articles almost free of deformation such as warpage and bending.

A first embodiment of the present invention for achieving the above object is directed to a molded article formed of a thermoplastic resin or a thermosetting resin and having two planes joining each other in a junction portion, at least one of the two planes having an opening portion in the vicinity of the junction portion.

A second embodiment of the present invention for achieving the above object is directed to a molded article being formed of a thermoplastic resin or a thermosetting resin and having two planes joining each other in a junction portion and a rib, at least one of the two planes having an opening portion in the vicinity of the junction portion, the rib extending along the inner surface and/or outer surface of the two planes from an in-plane area of one plane through the junction portion to an in-plane area of the other plane.

In the first and second embodiments of the present invention, at least one of the two planes has an opening portion in the vicinity of the junction portion. That is, the opening portion may be provided in one plane in the vicinity of the junction portion, or it may extend from an in-plane area of one plane to the junction portion. It is a preferred embodiment that the opening portion extends from an in-plane area of one plane through the junction portion to an in-plane area of the other plane. A plurality of opening portions may be provided along the junction portion.

The opening portion formed in a molded article as described above can reduce the portion which causes deformation such as warpage and bending, and can also decrease the difference between the raw material cooling rate inside the two planes and the raw material cooling rate outside the two planes in the vicinity of the junction portion, whereby the deformation of the molded article can be decreased.

In a more preferred embodiment according to the first embodiment, the length of the opening portion along the junction portion is $1/10$ to $9/10$, preferably $3/10$ to $9/10$, more preferably $5/10$ to $9/10$, of the length of the junction portion. When the above length is less than $1/10$ of the length of the junction portion, there is little effect on the deformation prevention. When the above length is more than $9/10$ of the length of the junction portion, the junction portion may show a decrease in junction strength.

In a more preferred embodiment according to the second embodiment of the present invention, the length of the opening portion along the junction portion is $1/10$ to $10/10$, preferably $3/10$ to $10/10$, more preferably $5/10$ to $10/10$, of the length of the junction portion. When the above length is less than $1/10$ of the length of junction portion, there is little effect on the deformation prevention. When the length of the opening portion along the junction portion is $10/10$ of the length of the junction portion, it means that the two planes are connected with a rib. The angle formed by the rib and the plane (gradient of rib) is 30 to 90 degrees, and the thickness of the rib is preferably 0.5 mm to 10 mm. When the angle formed by the rib and the plane is less than 30 degrees, the effect of the rib on preventing the deformation such as warpage and bending is low, and there is required a mold having a complicated structure. When the thickness of the rib is less than 0.5 mm, the effect of the rib on preventing the deformation is low. When this thickness exceeds 10 mm, the molding cycle, disadvantageously, takes a longer time.

A third embodiment of the present invention for achieving the above object is directed to a molded article formed of a thermoplastic resin or a thermosetting resin and having two planes joining each other in a junction portion, at least one of the two planes having a thin wall portion in the vicinity of the junction portion.

A fourth embodiment of the present invention for achieving the above object is directed to a molded article formed of a thermoplastic resin or a thermosetting resin and having two planes joining each other in a junction portion and a rib, at least one of the two planes having a thin wall portion in the vicinity of the junction portion, the rib extending along the inner and/or outer surfaces of the two planes from an in-plane area of one plane through the junction portion to an in-plane area of the other plane.

In the above third and fourth embodiments of the present invention, the thin wall portion can have any thickness if the thickness is smaller than the thickness of the plane to which the thin wall portion belongs to. The thickness of the thin wall portion preferably does not exceed $3/4$, and more preferably does not exceed $2/3$, of the thickness of the plane to which the thin wall portion belongs to. The smallest thickness of the thin wall portion can be a thickness at which the molded article is not broken under an outer force.

In the third and fourth embodiments of the present invention, at least one of the two planes has the thin wall portion in the junction portion. That is, one plane may have the thin wall portion in the junction portion, or the thin wall portion may extend from an in-plane area of one plane to the junction portion. In a preferred embodiment, the thin wall portion extends from an in-plane area of one plane through the junction portion to an in-plane area of the other plane. A molded article may be provided with one thin wall portion or a plurality of thin wall portions along the junction portion.

The thin wall portion formed in a molded article as described above can reduce the portion which causes deformation such as warpage and bending, and can also decrease the difference between the raw material cooling rate inside the two planes and the raw material cooling rate outside the two planes in the vicinity of the junction portion, whereby the deformation of the molded article can be decreased.

In a more preferred embodiment according to third and fourth embodiments of the present invention, the length of the thin wall portion along the junction portion is $1/10$ to $10/10$, preferably $3/10$ to $10/10$, more preferably $5/10$ to $10/10$, of the length of the junction portion. When the length of the thin wall portion is less than $1/10$ of the length of the junction portion, there is little effect on deformation prevention. When the rib is formed, the angle formed by the rib and the plane (gradient of rib) is 30 to 90 degrees, and the thickness of the rib is preferably 0.5 mm to 10 mm. When the angle formed by the rib and the plane is less than 30 degrees, the effect of the rib on preventing the deformation such as warpage and bending is low, and there is required a mold having a complicated structure. When the thickness of the rib is less than 0.5 mm, the effect of the rib on preventing the deformation is low. When this thickness exceeds 10 mm, the molding cycle, disadvantageously, takes a longer time.

The thickness of one of the planes may be the same as, or different from, the thickness of the other. The planes may have a flat surface or a curved surface. The junction portion may have a predetermined radius of curvature.

The thermoplastic resin and the thermosetting resin used in the present invention can be any thermoplastic resin and any thermosetting resin if they can be molded with an injection molding machine or a compression molding machine. In particular, the present invention can effectively reduce the deformation of a molded article which is produced from a resin having a high shrinkage factor.

The thermoplastic resin and the thermosetting resin used in the present invention may contain a filler. The filler may have the form of beads, fibers or flakes. The filler may be selected from carbon, glass and the like, which are usually incorporated into general injection-molding resins. These resins used in the present invention may further contain a stabilizer and a pigment, if necessary.

The molded article according to the present invention can be produced from a thermoplastic resin, a thermosetting resin, a thermoplastic resin containing a filler or a thermosetting resin containing a filler by a variety of molding methods such as an injection molding method and a compression molding method.

The thermoplastic resin used in the present invention is not specially limited, and it includes not only general-purpose plastics typified by polyolefin resin, a polystyrene resin, an ABS resin, an AS resin, a PVC resin, a methacrylic resin and a fluorine-containing resin, but also engineering plastics typified by a nylon resin, a saturated polyester resin, a polycarbonate resin, a polyacrylate resin, a polyacetal resin, a polysulfone resin and a modified polyphenylene ether resin.

The thermosetting resin used in the present invention is not specially limited, and it includes a phenolic resin, a furan resin, a xylene.formaldehyde resin, a ketone.formaldehyde resin, a urea resin, a melamine resin, aniline resin, an alkyd resin, an unsaturated polyester resin and an epoxy resin.

The conditions for producing the molded article of the present invention, e.g., an amount of a molten resin, a temperature, a pressure and a time for cooling a mold, cannot be uniformly determined, and these conditions need to be properly selected and controlled depending upon what resin is used and what form the mold has.

A variety of parameters such as the forms, sizes and numbers of the opening portion(s) and the thin wall portion(s) and the form, size and number of the optional rib(s) are not uniformly determined, either. These parameters are properly determined depending upon the form and cross sectional form of a molded article and a raw material to be used. These parameters are to be changed depending upon the form and size of a molded article, the strength required of a molded article, the kind of a resin to be used, the use or non-use of an additive and the shrinkage factor of a raw material in molding, and it is therefore required to optimize these parameters according to these conditions. When these parameters are optimized, the deformation of a molded article such as warpage and bending can be very effectively reduced.

According to the present invention, therefore, there can be industrially produced molded articles required to have high dimensional standard such as an automobile door mirror stay, an automobile door glass holder, a housing, an IC box and a chassis of a copying machine.

For example, an automobile door mirror stay of the present invention molded from a thermoplastic resin has two planes which join each other in a junction portion and ribs, in which one plane constitutes a mirror fitting portion, the other plane constitutes a portion to be fixed to an automobile body, at least one of the two planes has an opening portion in the vicinity of the junction portion, and the ribs extend along the inner and/or outer surfaces of the two planes from an in-plane area of one plane through the junction portion to an in-plane area of the other plane.

In the above door mirror stay, the length of the opening portion along the junction portion is preferably $1/10$ to $10/10$ of the length of the junction portion. Further, the angle formed by the rib and the plane (gradient of rib) is preferably 30 to 90 degrees, and the thickness of the rib is preferably 0.5 to 10 mm.

For example, an automobile door glass holder of the present invention molded from a thermoplastic resin has a bottom plane and two side planes which join the bottom plane in junction portions, in which the two side planes are generally parallel with each other, a piece of automobile door glass is placed in a space defined by the bottom plane and the two side planes, and at least one of the these planes has an opening portion in the vicinity of the corresponding junction portion.

In the above automobile door glass holder, the opening portion preferably extends from an in-plane area of the bottom plane through the junction portion to in-plane area(s) of the side plane(s). Further, the length of the opening portion along the junction portion is preferably $1/10$ to $9/10$ of the length of the junction portion.

For example, a box-shaped molded article of the present invention, molded from a thermoplastic resin, has a bottom plane, side planes and junction portions where the bottom plane and the side planes join, in which at least one of these planes has an opening portion in the vicinity of the corresponding junction portion.

In the above box-shaped molded article, the opening portion preferably extends from an in-plane area of the bottom plane through the junction portion to an in-plane area of the side plane. Further, a rib may be formed which extends along the inner and/or outer surfaces of the bottom plane and any one of the side planes from an in-plane area of the bottom plane through the junction portion to an in-plane area of the side plane. When no rib is formed, the length of the opening portion along the junction portion is preferably $1/10$ to $9/10$ of the length of the junction portion. When a rib is formed, the length of the opening portion along the junction portion is preferably $1/10$ to $10/10$ of the length of the junction portion.

For example, a box-shaped molded article of the present invention, molded from a thermoplastic resin, has a bottom plane, side planes and junction portions where the bottom plane and the side planes join, in which at least one of the these planes has a thin wall portion in the corresponding junction portion.

In the above box-shaped molded article, the thin wall portion preferably extends from an in-plane area of the bottom plane through the junction portion to an in-plane area of the side plane. Further, a rib may be formed which extends along the inner and/or outer surfaces of the bottom plane and the side plane, from an in-plane area of the bottom plane through the junction portion to an in-plane area of the side plane. The length of the thin wall portion along the junction portion is preferably ⅒ to ¹⁰⁄₁₀ of the length of the junction portion.

The above box-shaped molded article may include a housing, an IC box and a chassis of a copying machine.

DESCRIPTION OF THE PREFERRED EMBODIMENTS

Figure 1:
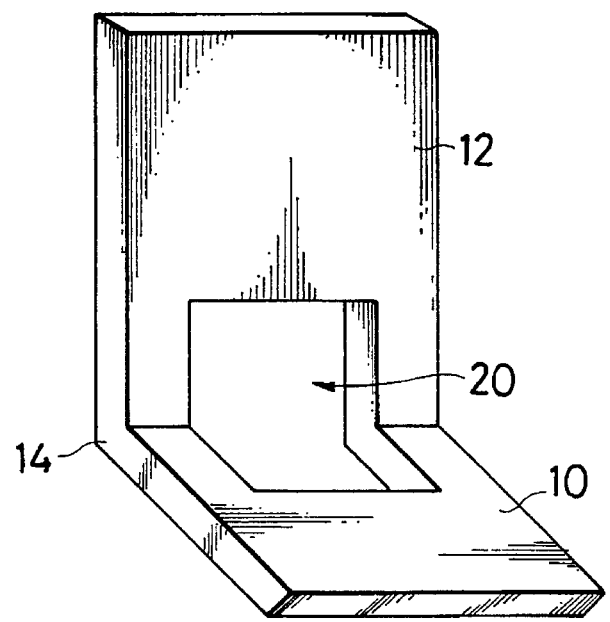
FIGS. 1, 2A and 2B, 2C, 2D and 3A, 3B show molded articles according to a first embodiment of the present invention.

FIGS. 1 and 2 show a molded article according to the first embodiment of the present invention. This molded article has two planes (or wall members) 10 and 12 and a junction portion 14. An opening portion 20 extends from an in-plane area of the plane 10 through the junction portion 14 to an in-plane area of the other plane 12. Specifically, FIG. 1 is a perspective view of this molded article. FIG. 2A is its front view, FIG. 2B is its plan view, and FIG. 2C is its left side view. The plane 10 and the plane 12 form an angle of about 120 degrees. FIG. 2D is its cross-sectional view showing the opening portion 20.

Figure 3A:
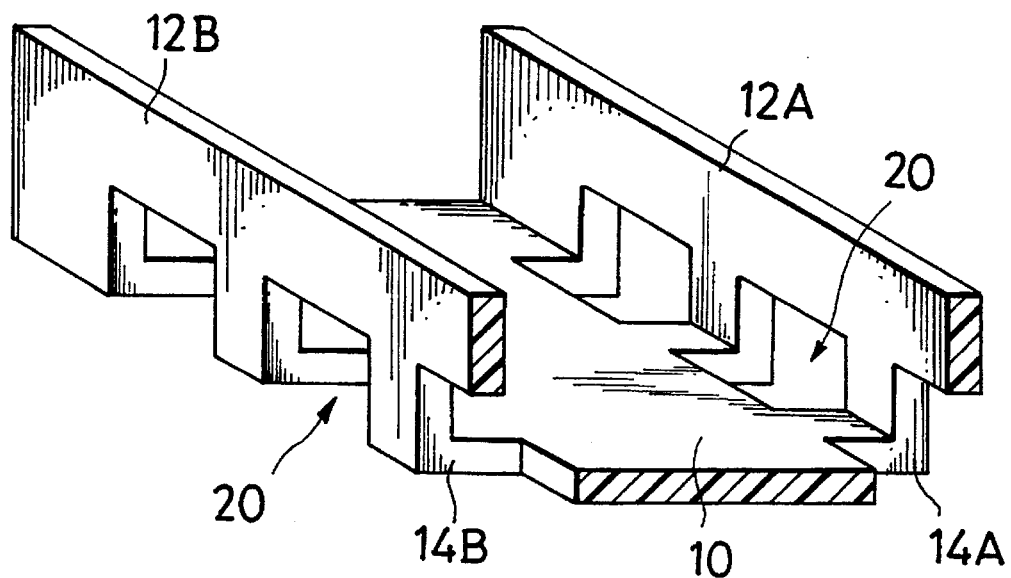

FIG. 3 shows other molded articles according to the first embodiment of the present invention. One molded article, whose partially cut section is shown in FIG. 3A, has two combinations of planes (planes 10 and 12A; planes 10 and 12B), and two junction portions 14A and 14B. The two planes 10 and 12A join each other in the junction portion 14A, and the two planes 10 and 12B join each other in the junction portion 14B. A plurality of opening portions 20 extend from an in-plane area of the plane 10 through the junction portion 14A to an in-plane area of the plane 12A. Further, a plurality of opening portions 20 are extending from an in-plane area of the plane 10 through the junction portion 14B to an in-plane area of the plane 12B.

Figure 3B:
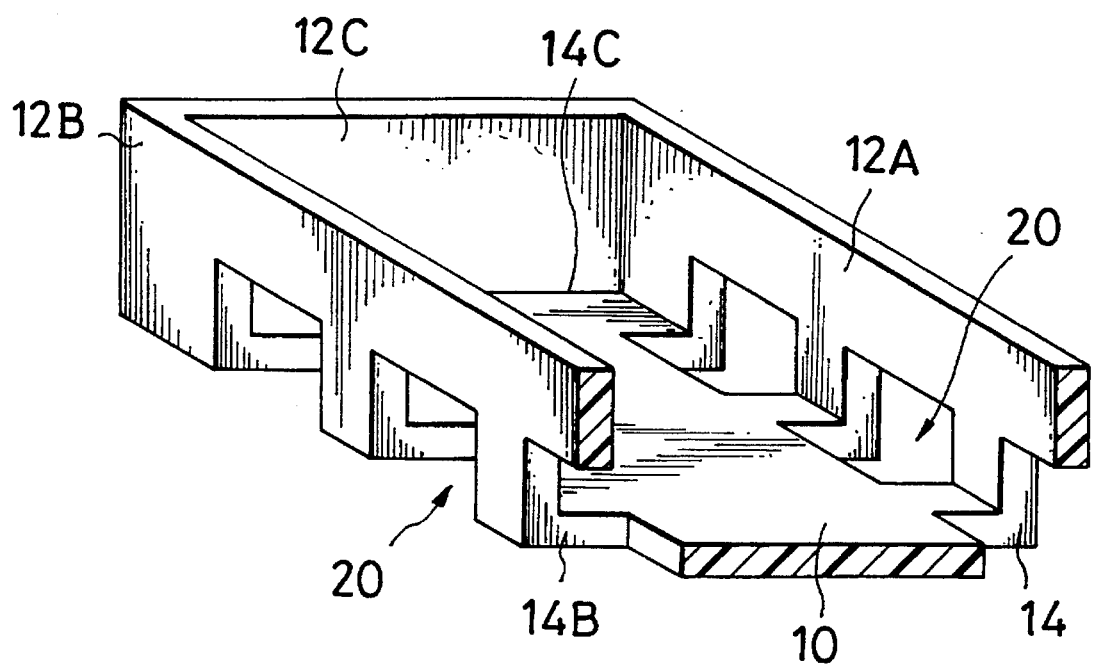
Figure 5A:
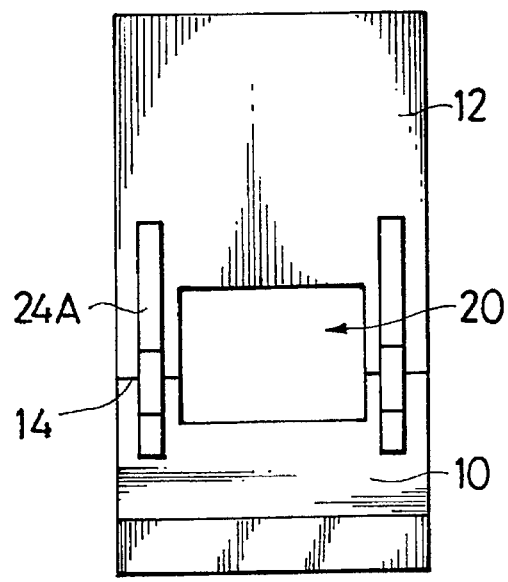
Figure 5B:
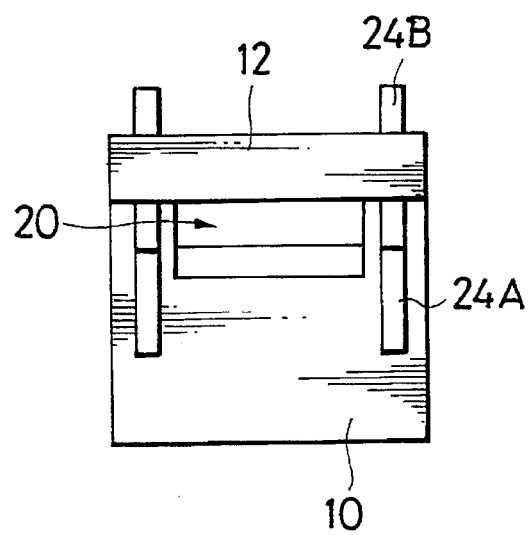
Figure 5C:
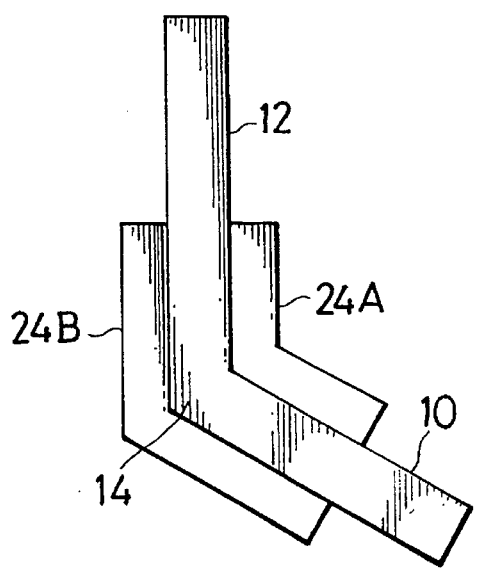
Figure 5D:
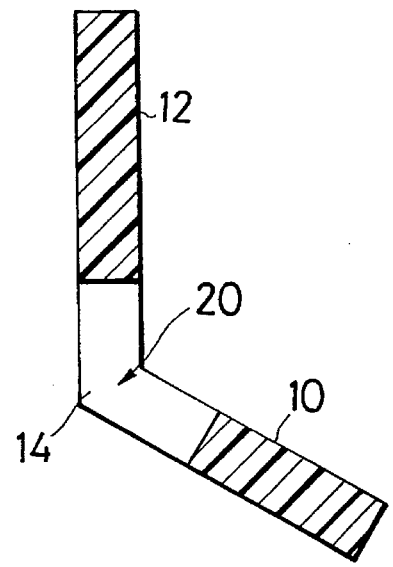

Another molded article, whose partially cut section is also shown in FIG. 3B, has three combinations of planes (planes 10 and 12A; planes 10 and 12B; planes 10 and 12C), and three junction portions 14A, 14B and 14C. The two planes 10 and 12A join each other in the junction portion 14A, the two planes 10 and 12B join each other in the junction portion 14B, and the two planes 10 and 12C join each other in the junction portion 14C. A plurality of opening portions 20 extend from an in-plane area of the plane 10 through the junction portion 14A to an in-plane area of the plane 12A. Further, a plurality of opening portions 20 extend from an in-plane area of the plane 10 through the junction portion 14B to an in-plane area of the plane 12B. FIG. 3B shows no opening portions in the plane 12C and in that in-plane area of the plane 10 which is adjacent to the plane 12C, whereas there may be formed opening portion(s) which extend from an in-plane area of the plane 10 through the junction portion 14C to an in-plane area of the plane 12C.

Figure 4:
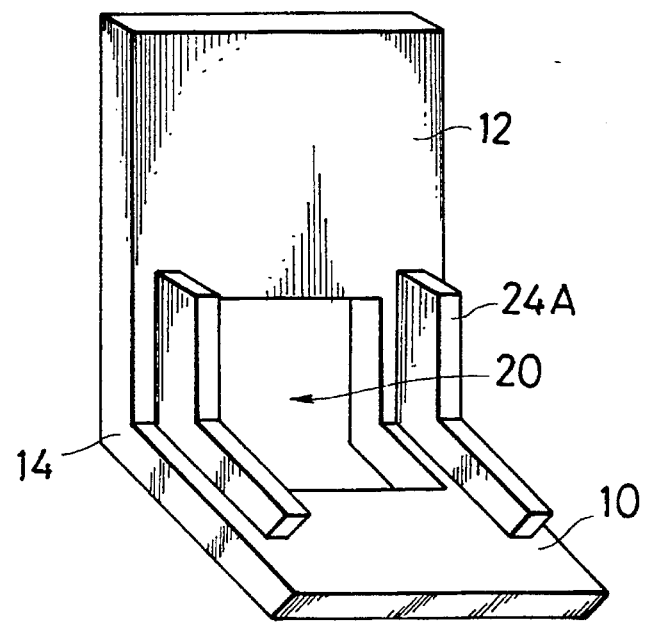
FIGS. 4, 5A, 5B, 5C, 5D and 6A, 6B show molded articles according to a second embodiment of the present invention.
Figure 2A:
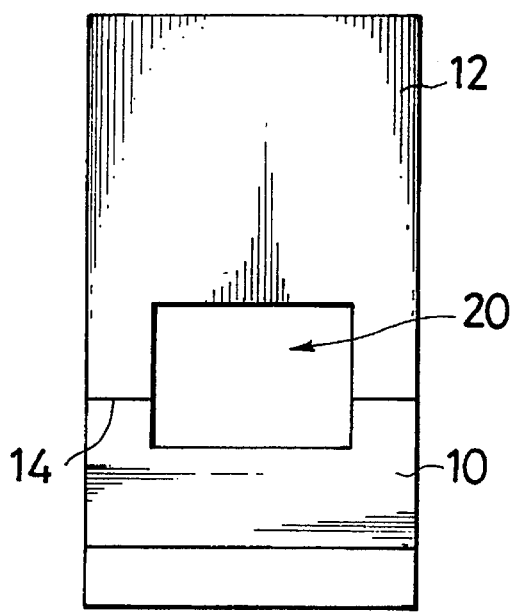
Figure 2B:
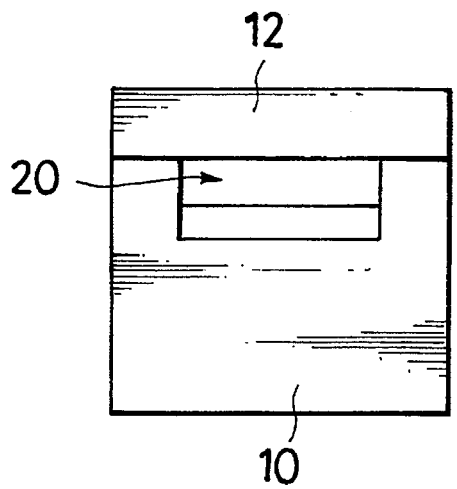
Figure 2C:
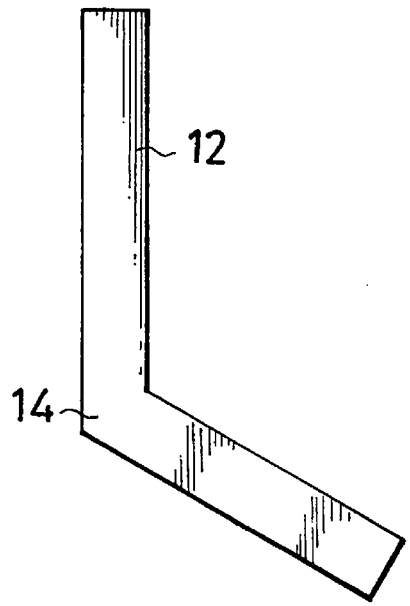
Figure 2D:
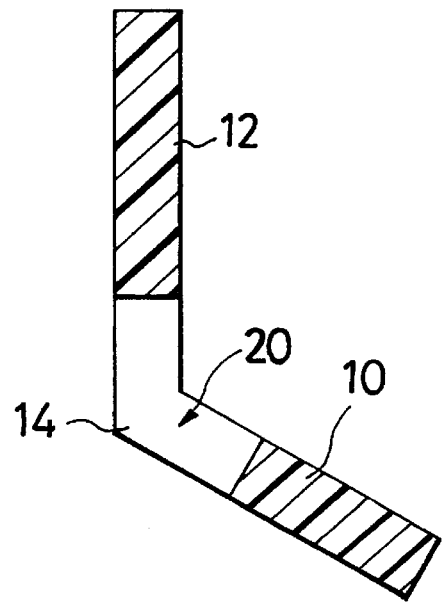

FIGS. 4 and 5 show a molded article according to the second embodiment of the present invention. This molded article has two planes 10 and 12 and one junction portion 14. One opening portion 20 extends from an in-plane area of the plane 10 through the junction portion 14 to an in-plane area of the other plane 12. Further, ribs 24A extend along the inner surfaces of the two planes 10 and 12 from an in-plane area of the plane 10 through the junction portion 14 to an in-plane area of the other plane 12. Ribs 24B extend along the outer surfaces of the two planes 10 and 12, from an in-plane area of the plane 10 through the junction portion 14 to an in-plane area of the other plane 12. FIG. 4 is a perspective view of this molded article. FIG. 5A is its front view, FIG. 5B is its plan view, FIG. 5C is its left side view, and FIG. 5D is its cross-section showing the opening portion 20. The plane 10 and the plane 12 form an angle of about 120 degrees. The ribs 24A and 24B and the plane 10 form angles of 90 degrees, and the ribs 24A and 24B and the plane 12 form angles of 90 degrees.

Figure 6A:
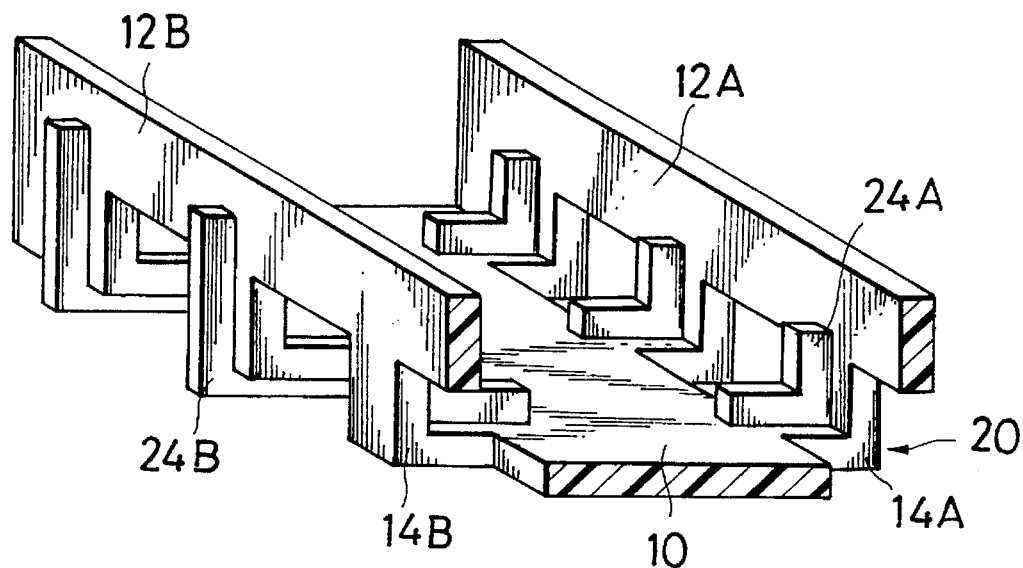
Figure 6B:
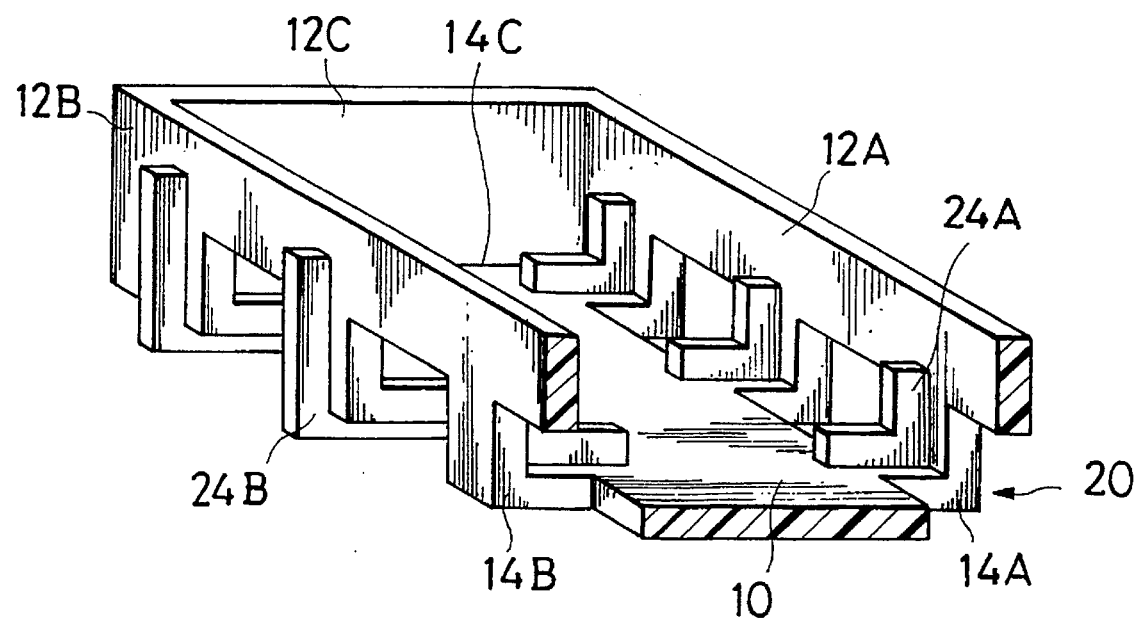

FIG. 6 shows other molded articles according to the second embodiment of the present invention. The molded articles, whose partially cut sections are also shown in FIGS. 6A and FIG. 6B, are the same as those shown in FIGS. 3A and 3B except that the molded articles shown in FIGS. 6A and 6B have ribs 24A and ribs 24B. A detailed explanation of these molded articles is therefore omitted. In addition, some of the ribs 24B outside the planes are not shown for simplification of the drawing.

Figure 7A:
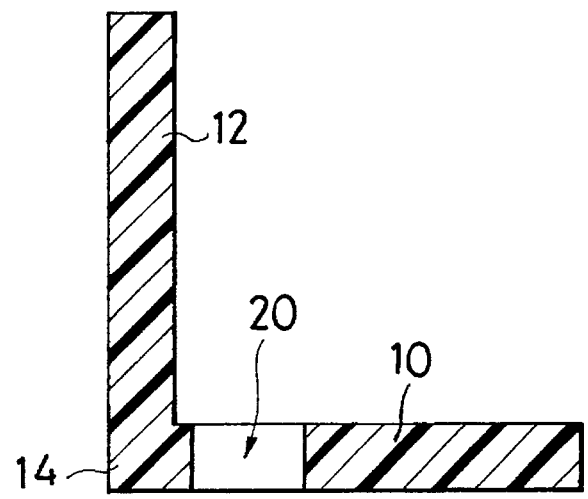
FIGS. 7A, 7B, and 7C show variations of the molded articles according to the first and second embodiments of the present invention.
Figure 7B:
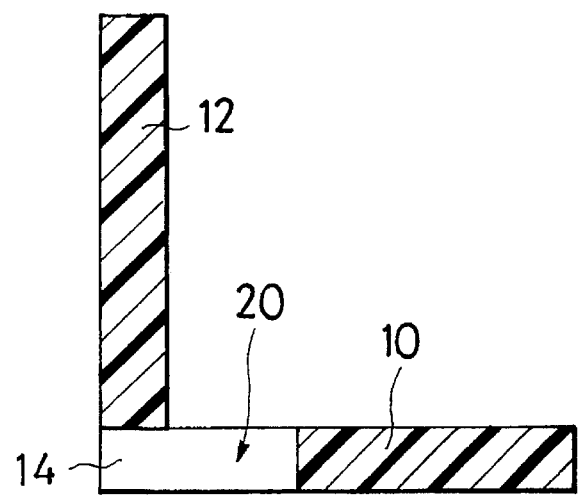
Figure 7C:
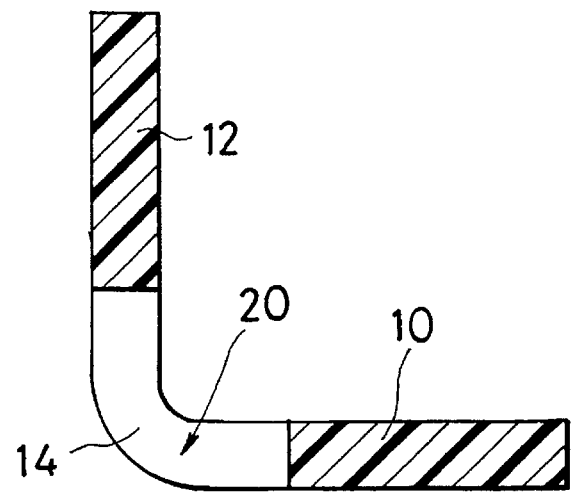

FIG. 7 shows schematic cross sections of opening portions of molded articles according to the first and second embodiments of the present invention. FIG. 7A shows an embodiment in which an opening portion 20 is formed in one plane in the vicinity of or adjacent to a junction portion 14 where the plane joins another plane. FIG. 7B shows an embodiment in which an opening portion 20 extends from an in-plane area of one plane to a junction portion 14. FIG. 7C shows an embodiment in which an opening portion 20 extends from an in-plane area of one plane through a junction portion 14 to an in-plane area of the other plane. Thus the opening portion 20 can be said to be formed at least adjacent to the junction portion 14. As also shown in FIG. 7C, the junction portion may be chamfered. That is, the junction portion may have a predetermined radius of curvature. One of the outer and inner surfaces of the junction portion may be chamfered.

Figure 8:
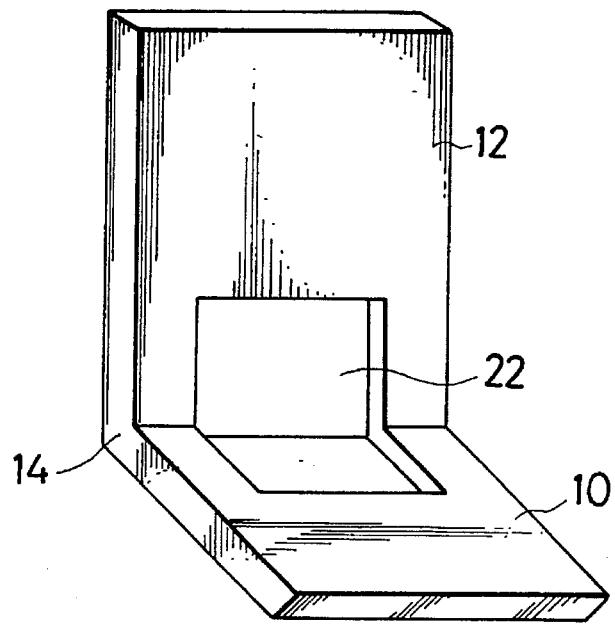
FIGS. 8, 9A, 9B, 9C, 9D and 10A & 10B show molded articles according to a third embodiment of the present invention.

FIGS. 8 and 9 show a molded article according to a third embodiment of the present invention. This molded article has two planes 10 and 12 and one junction portion 14. One thin wall portion 22 extends from an in-plane area of the plane 10 through the junction portion 14 to an in-plane area of the other plane 12. FIG. 8 shows a perspective view of this molded article. FIG. 9A is a front view of this molded article, FIG. 9B is its plan view, FIG. 9C is its left side view and FIG. 9D is a cross-sectional view showing the thin wall portion 22. The planes 10 and 12 form an angle of about 120 degrees.

Figure 10A:
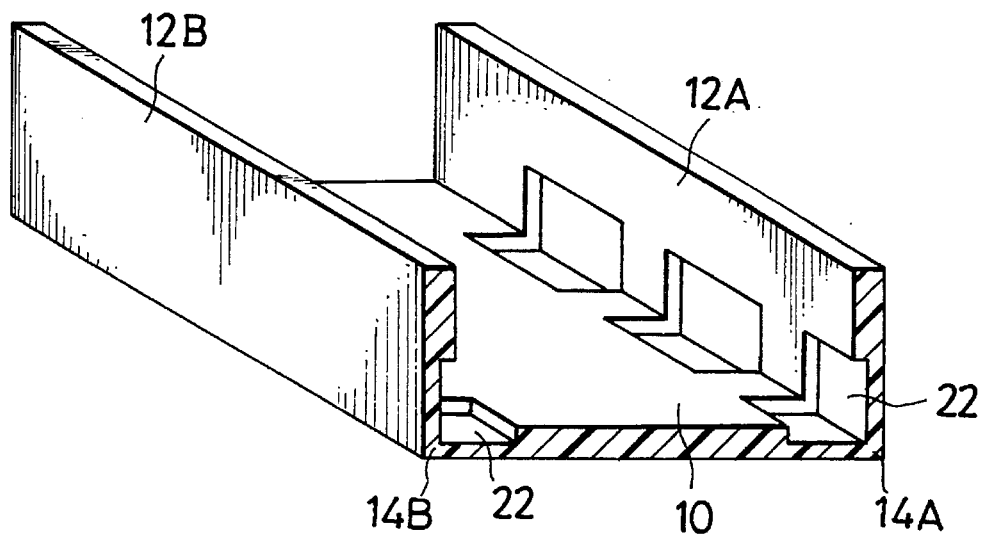
Figure 10B:
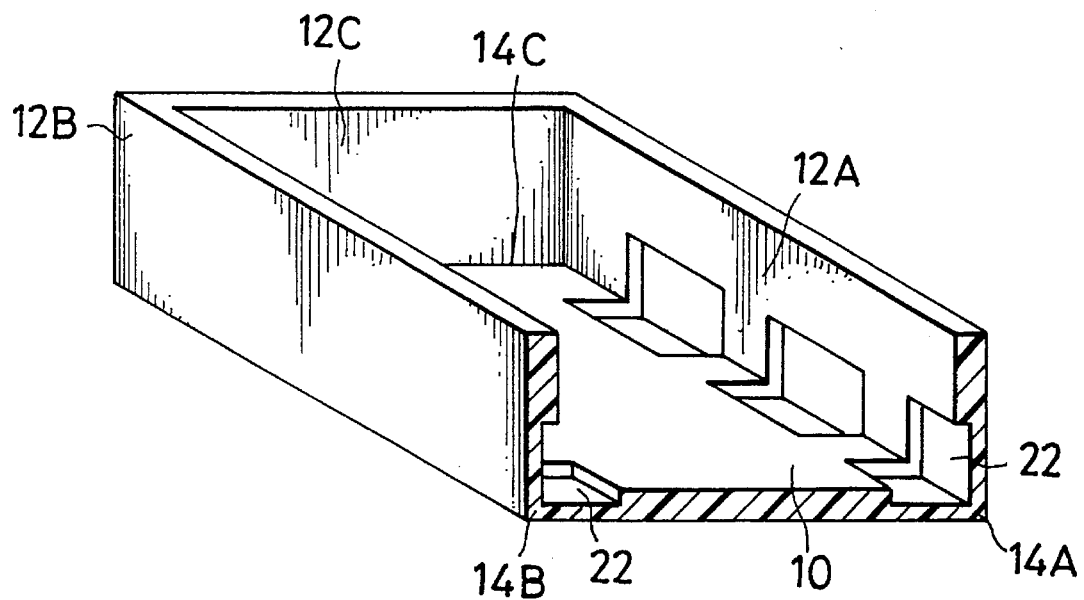
Figure 12A:
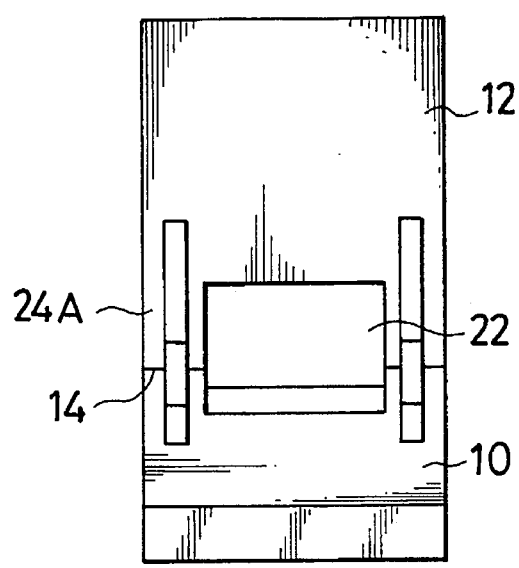
Figure 12B:
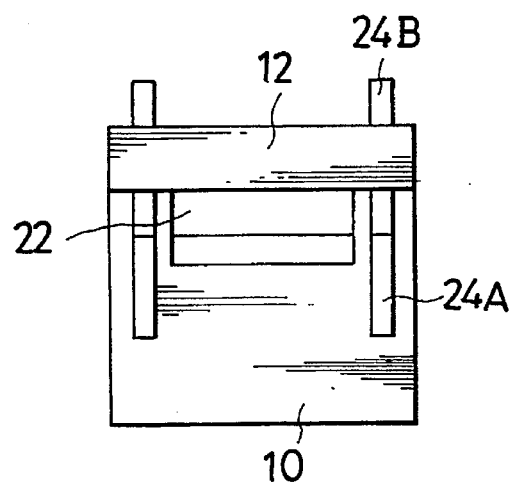
Figure 12C:
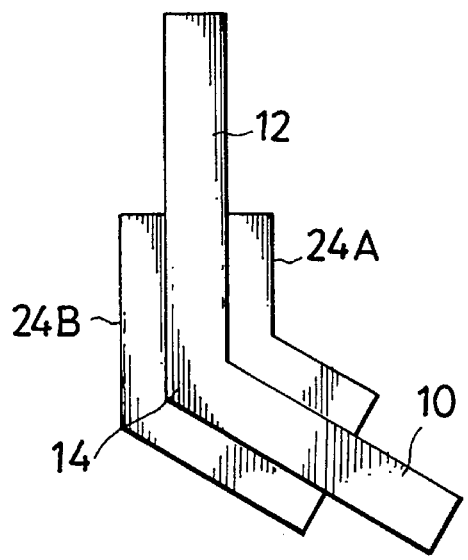
Figure 12D:
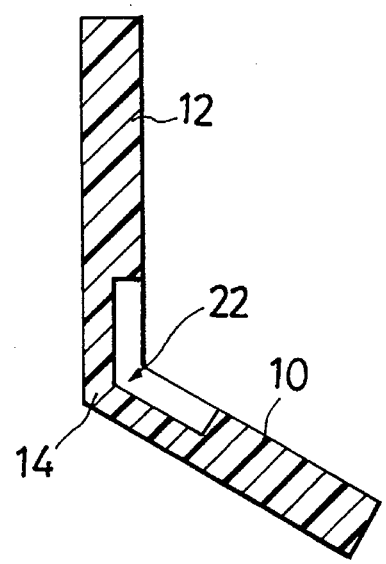

FIG. 10 shows other molded articles according to the third embodiment of the present invention. The molded articles, whose partially cut sections are shown in FIGS. 10A and 10B, are the same as those shown in FIGS. 3A and 3B, except that the molded articles shown in FIGS. 10A and 10B have thin wall portions 22 in place of the opening portions. A detailed explanation of these molded articles is therefore omitted.

Figure 11:
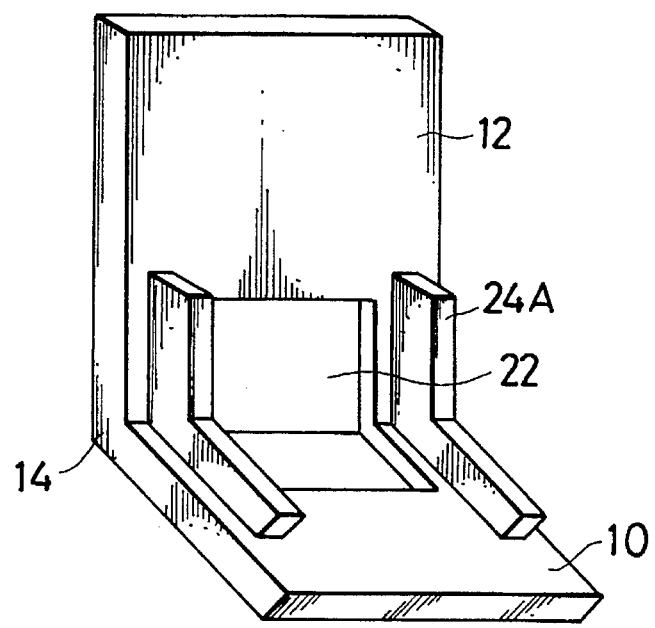
FIGS. 11, 12A, 12B, 12C, 12D and 13A & 13B show molded articles according to a fourth embodiment of the present invention.
Figure 9A:
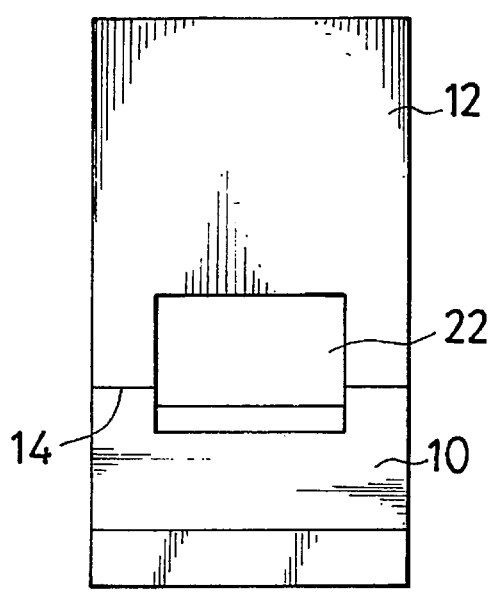
Figure 9B:
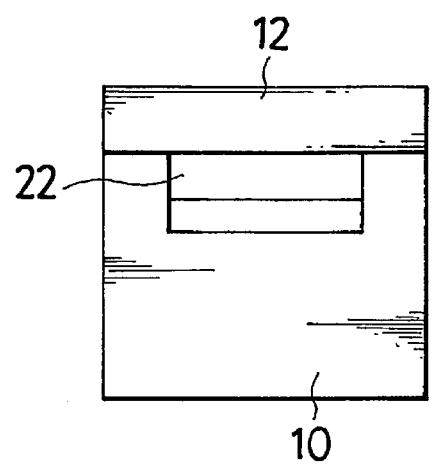
Figure 9C:
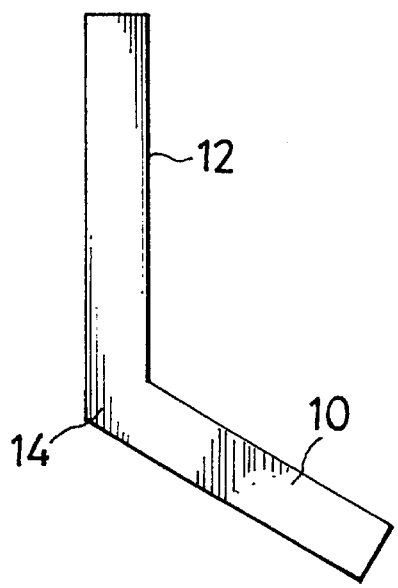
Figure 9D:
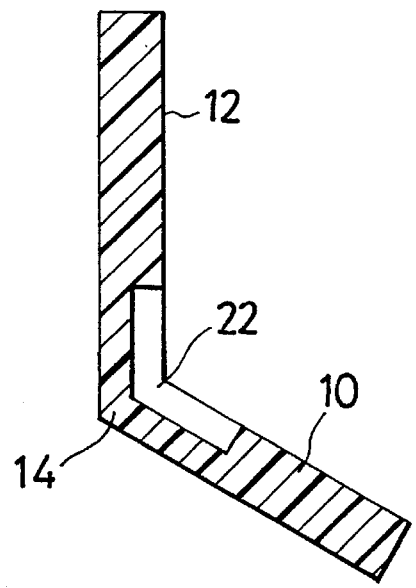

FIGS. 11 and 12 show a molded article according to a fourth embodiment of the present invention. This molded article has two planes 10 and 12 and one junction portion 14. One thin wall portion 22 extends from an in-plane area of the plane 10 through the junction portion 14 to an in-plane area of the other plane 12. Ribs 24A extend along the inner surfaces of the planes 10 and 12 from an in-plane area of the plane 10 through the junction portion 14 to an in-plane area of the other plane 12. Further, ribs 24B extend along the outer surfaces of the planes 10 and 12 from an in-plane area of the plane 10 through the junction portion 14 to an in-plane area of the other plane 12. FIG. 11 shows a perspective view of this molded article. FIG. 12A is a front view of this molded article, FIG. 12B is its plan view, FIG. 12C is its left side view, and FIG. 12D is a cross sectional view showing the thin wall portion 22. The planes 10 and 12 form an angle of about 120 degrees. The ribs 24A and 24B and the plane 10 form an angle of 90 degrees, and the ribs 24A and 24B and the plane 12 form an angle of 90 degrees.

Figure 13A:
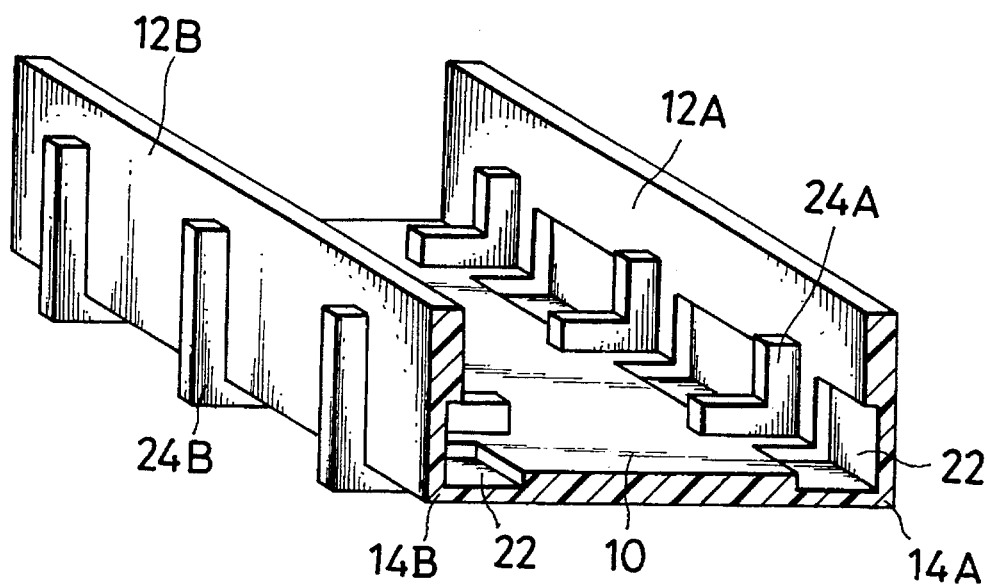
Figure 13B:
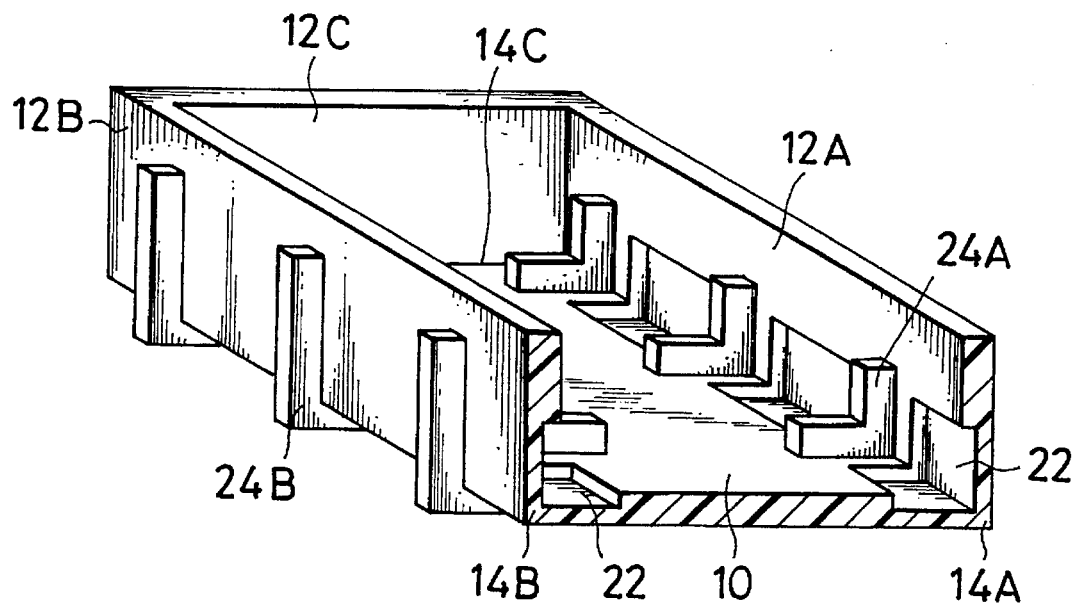
Figure 14A:
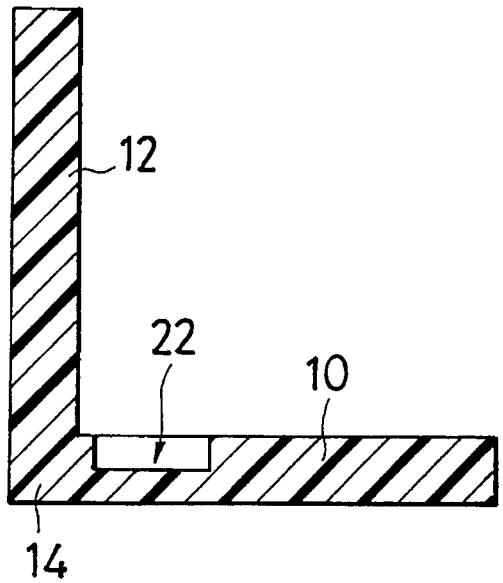
FIGS. 14A, 14B, 14C, 14D and 15A, 15B, 15C, 15D show variations of molded articles according to the third and fourth embodiment of the present invention.
Figure 14B:
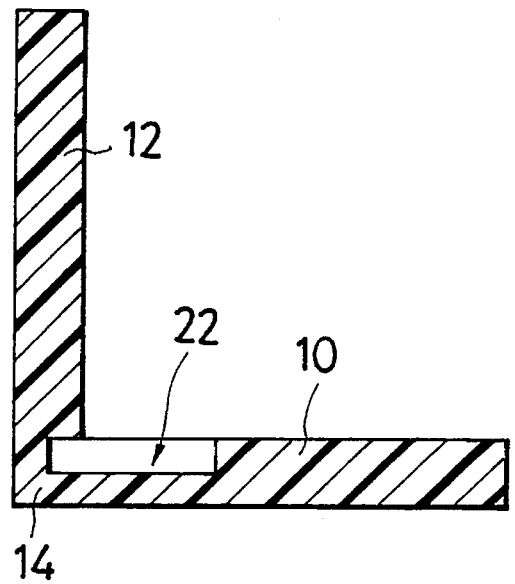
Figure 14C:
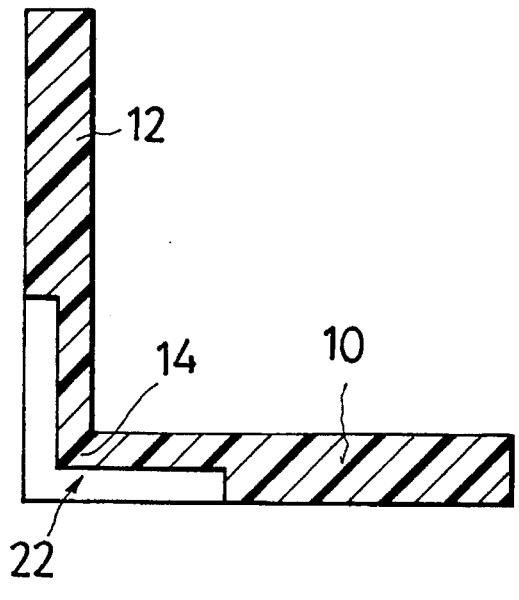
Figure 14D:
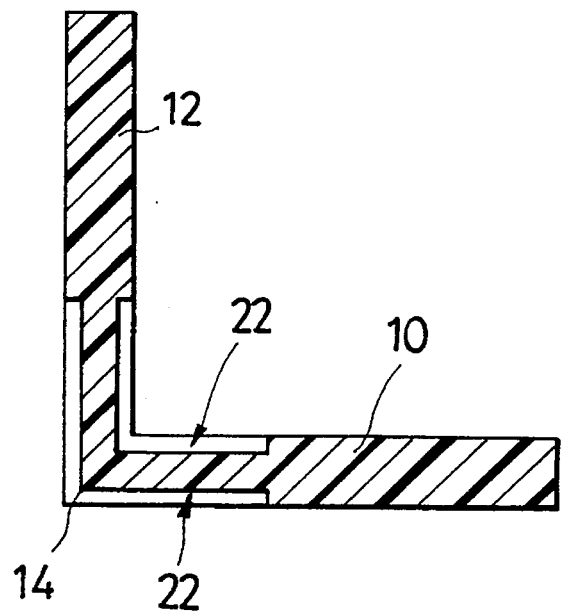

FIG. 13 shows other molded articles according to the fourth embodiment of the present invention. The molded articles, whose partially cut sections are shown in FIGS. 13A and 13B, are the same as those shown in FIGS. 10A and 10B, except that the molded articles shown in FIGS. 13A and 13B have ribs 24A and ribs 24B. A detailed explanation of these molded articles is therefore omitted.

Figure 15A:
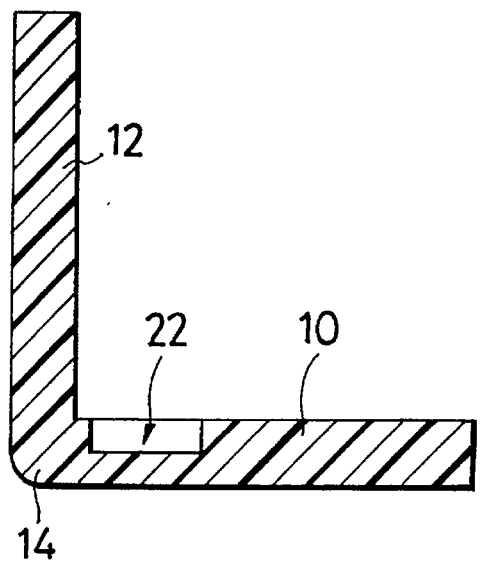
Figure 15B:
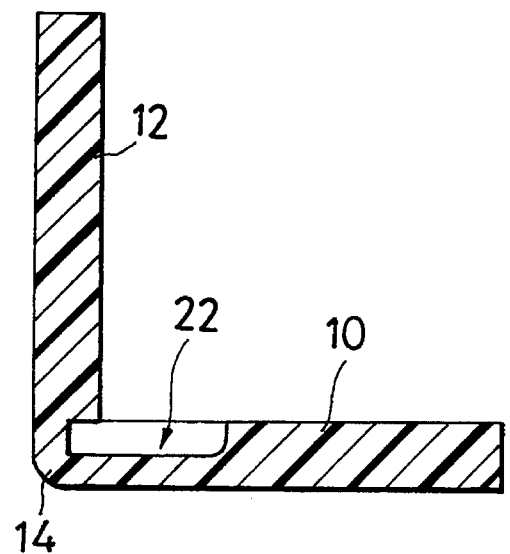
Figure 15C:
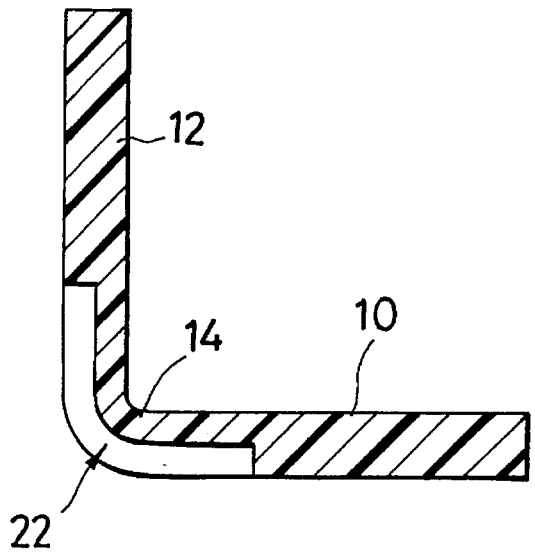
Figure 15D:
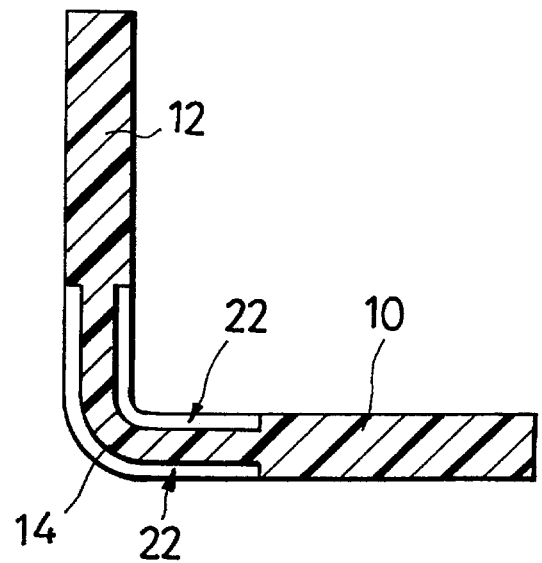

FIG. 14 shows partial cross-sectional views of thin wall portions of the molded articles according to the third and fourth embodiments of the present invention. FIG. 14A shows a thin wall portion 22 formed in a plane 10 in the vicinity of a junction portion 14, FIG. 14B shows a thin wall portion 22 extending from an in-plane area of a plane 10 into a junction portion 14. In FIGS. 14A and 14B, the outer surface of the plane 10 constitutes the outer surfaces of the thin wall portion 22. In FIG. 14C, the inner surfaces of the planes 10 and 12 constitute the inner surfaces of a thin wall portion 22. In FIG. 14D, the inner and outer surfaces of a thin wall portion 22 differ from the inner and outer surfaces of the planes 10 and 12. Further, as shown in FIGS. 15A and 15B, the junction portion may be chamfered. As shown in FIGS. 15B, 15C and 15D, the thin wall portion may be chamfered.

EXAMPLE 1

Figure 16A:
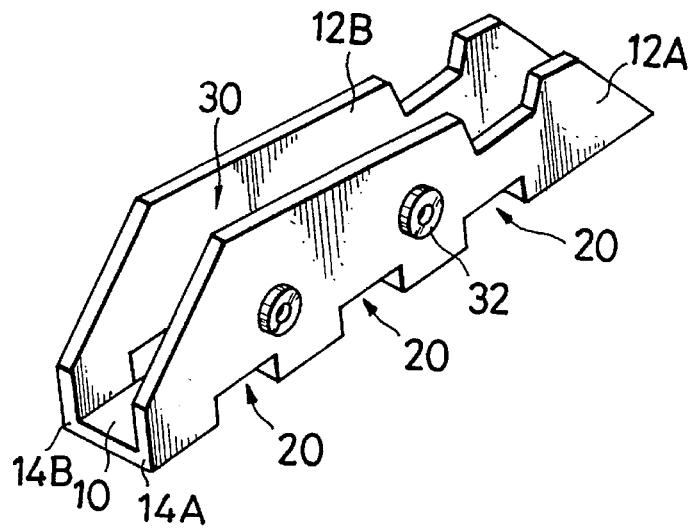
FIGS. 16A, 16B, 16C show an application of the molded article according to the first embodiment of the present invention to an automobile door glass holder.
Figure 16B:
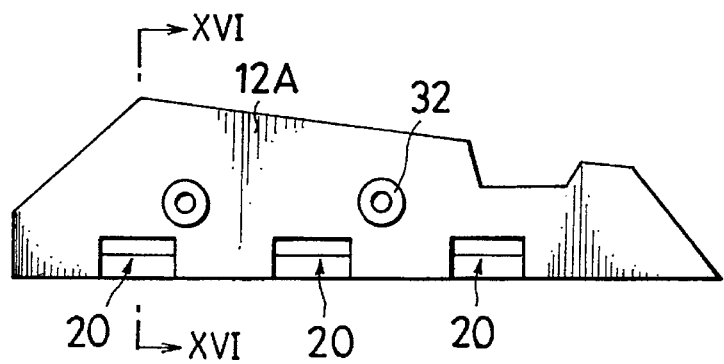

A molded article according to the first embodiment of the present invention was applied to an automobile door glass holder. An automobile door glass holder whose perspective view is shown in FIG. 16A, was produced by injection-molding a polyacetal resin (trade name: Iupital F20-03, supplied by Mitsubishi Gas Chemical Company, Inc.) according to a conventional method. As shown in FIG. 16A, the automobile door glass holder had a structure in which the cross section was nearly U-letter-shaped and a piece of door glass (not shown) was placed in a central portion 30 and fixed therein. The automobile door glass holder had two combinations of planes (planes 10 and 12A, and planes 10 and 12B) and two junction portions 14A and 14B. In FIG. 16, numeral 32 indicates an actuating portion-connecting portion.

In Example 1, the automobile door glass holder was provided with six opening portions 20, which extended from an in-plane area of the plane 10 (bottom) through the junction portion 14A or 14B to an in-plane area of the other planes 12A or 12B (side planes). The two side planes were nearly parallel with each other.

The automobile door glass holder in Example 1 had the following dimensions. In the perspective view of FIG. 16A, the bottom plane had a length of 100 mm and a width of 14 mm. The bottom plane and the side planes had a thickness of 3 mm, respectively. In the front view of FIG. 16B, the maximum height of each side plane was 20 mm. The opening portions 20 were positioned such that their central portions were 18 mm, 43 mm and 55 mm apart from the left end of the holder in the front view of FIG. 16B, and the width of each opening portion was 12 mm. In the cross section of FIG. 16C, taken along a line XVI—XVI of FIG. 16B, the width of each opening portion in the bottom 10 was 5 mm, and the height of each opening portion along the height of the side planes 12A and 12B was 5 mm.

Figure 16C:
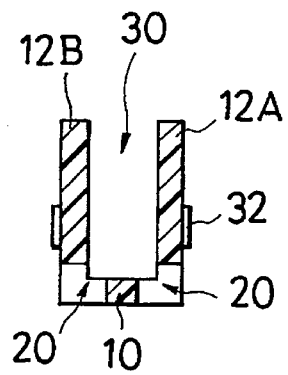

The above-obtained holder showed an inward warpage value of 0.9 mm in top portions corresponding to the top portions of U-letter as shown in FIG. 16C. That is, when the designed internal distance between the top portions of the U-letter-shaped portion was taken as $L_D$ and the found internal distance was taken as $L_0$, the warpage ($\Delta L = L_D - L_0$) was 0.9 mm. The inward warpage of the automobile glass holder obtained in Example 1 was very small, and a piece of glass was easily inserted into the holder.

COMPARATIVE EXAMPLE 1

Figure 17:
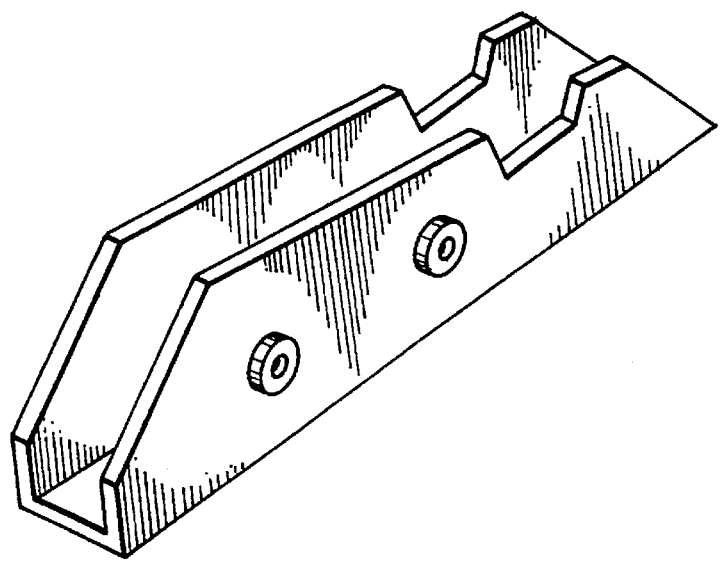
FIG. 17 shows a perspective view of a molded article (automobile door glass holder) prepared in a Comparative Example 1.
Figure 26:
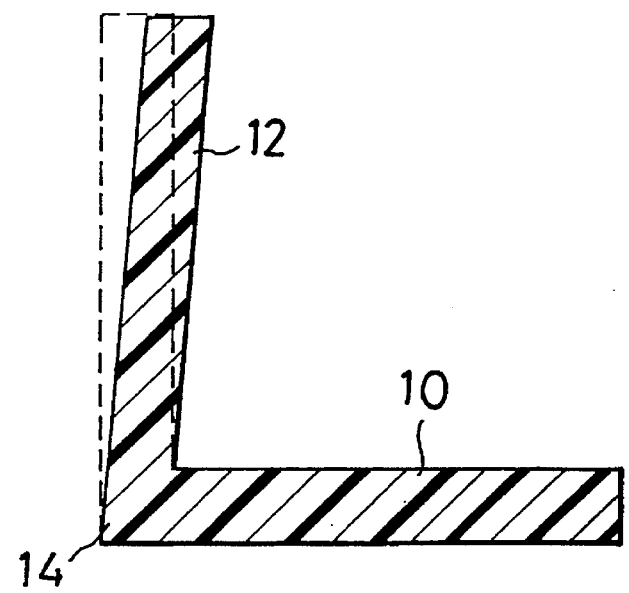
FIG. 26 schematically shows a state of a deformed molded article.

A molded article (automobile door glass holder) was produced in the same manner as in Example 1, except that no opening portion was formed. The external dimensions, etc., of the resultant molded article were the same as those of the molded article prepared in Example 1. FIG. 17 shows the perspective view of this molded article. The inward warpage ($\Delta L = L_D - L_0$) of the top portions of its U-letter shaped portion was 3.5 mm. The result of this warpage measurement shows that the warpage of a molded article can be remarkably reduced by forming an opening portion.

EXAMPLE 2

A molded article according to the first embodiment of the present invention was applied to an automobile IC box. The IC box refers to a box used for equipping an automobile with IC-mounted printed circuit boards, etc. A box-shaped molded article (automobile IC box) whose perspective view is shown in FIG. 18 was produced by injection-molding a polyacetal resin (trade name: Iupital F20-30, supplied by Mitsubishi Gas Chemical Company, Inc.) according to a conventional method.

Figure 18A:
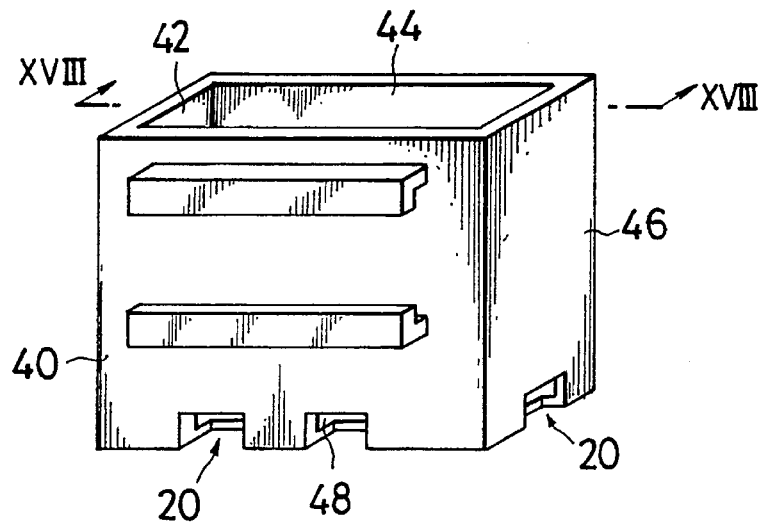
FIGS. 18A, 18B, 18C, 18D show an application of the molded article according to the first embodiment of the present invention to a box-shaped molded article (automobile IC box).
Figure 18B:
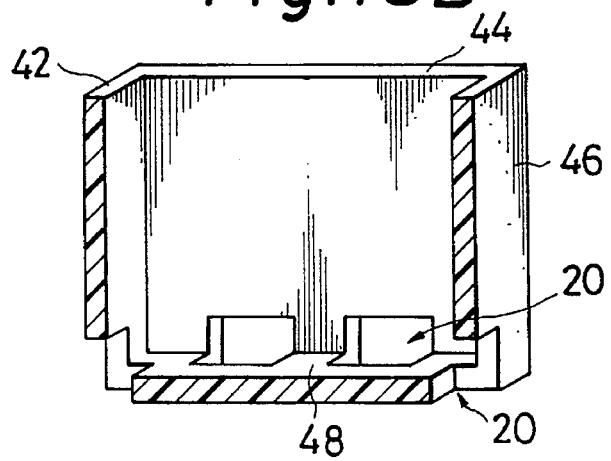

The external dimensions of the above-produced automobile IC box per the perspective view in FIG. 18A were as follows. The length was 75 mm, the width was 45 mm, the height was 60 mm, and the thickness of each plane was 3 mm. This automobile IC box had four side planes (front plane 40, left side plane 42, back plane 44 and right side plane 46) and one bottom plane 48. FIG. 18B shows a cross section of the automobile IC box, taken along the line XVIII—XVIII in FIG. 18A.

Figure 18C:
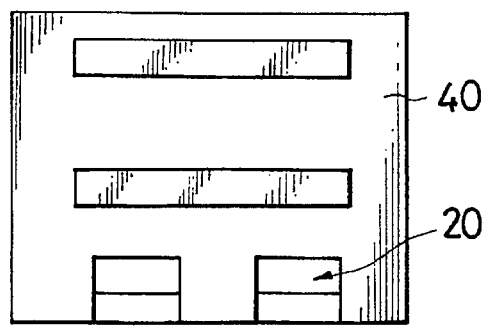
Figure 18D:
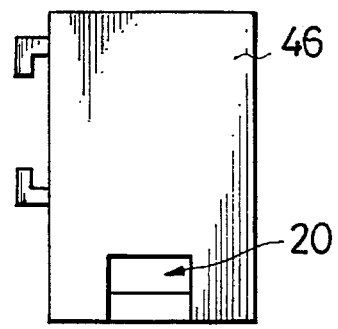

In order to prevent warpage in this Example 2, the IC box was provided with six opening portions 20 as shown in the front view and the side view in FIGS. 18C and 18D. That is, each of two combinations of the planes (planes 48 and 40 and planes 48 and 44) was provided with 2 opening portions 20, each of which was extending from an in-plane area of one plane through a junction portion to an in-plane area of the other plane. Each of the two combinations of the planes (planes 48 and 42 and planes 48 and 46) was provided with one opening portion 20, which extends from an in-plane area of one plane through a junction portion to an in-plane area of the other plane.

The opening portions 20 formed in the front, side and back planes and the bottom plane were positioned at equal intervals from the side planes, and the six opening portions had the same dimensions. In the front view of FIG. 18C, the opening portions had a width of 15 mm, a height of 15 mm and a depth of 15 mm.

The back plane 44 showed an inward warpage, $\Delta L_1$, of 0.9 mm when measured from an imaginary line connecting a corner formed by the left side plane 42 and the back plane 44 and a corner formed by the right side plane 46 and the back plane 44. The left side plane 42 showed an inward warpage, $\Delta L_2$, of 0.4 mm when measured from an imaginary line connecting a corner formed by the front plane 40 and the left side plane 42 and a corner formed by the back plane 44 and the left side plane 42.

COMPARATIVE EXAMPLE 2

A molded article was produced in the same manner as in Example 2, except that no opening portions were formed. The resultant molded article showed an inward warpage, $\Delta L_1$, of 2.8 mm and another inward warpage, $\Delta L_2$, of 1.2 mm.

The above results of the warpage measurements show that the deformation of a molded article can be effectively prevented by forming opening portions in the molded article. Conventional automobile IC boxes have showed large warpage, and it has been therefore difficult in many cases to install parts such as an IC-mounted printed circuit board therein. However, the deformation of the automobile IC box can be remarkably reduced by forming an opening portion in its plane(s). As a result, IC-mounted printed circuit boards, etc., can be very easily installed in an automobile IC box, and the IC box can be very easily installed in place.

EXAMPLE 3

Figure 19A:
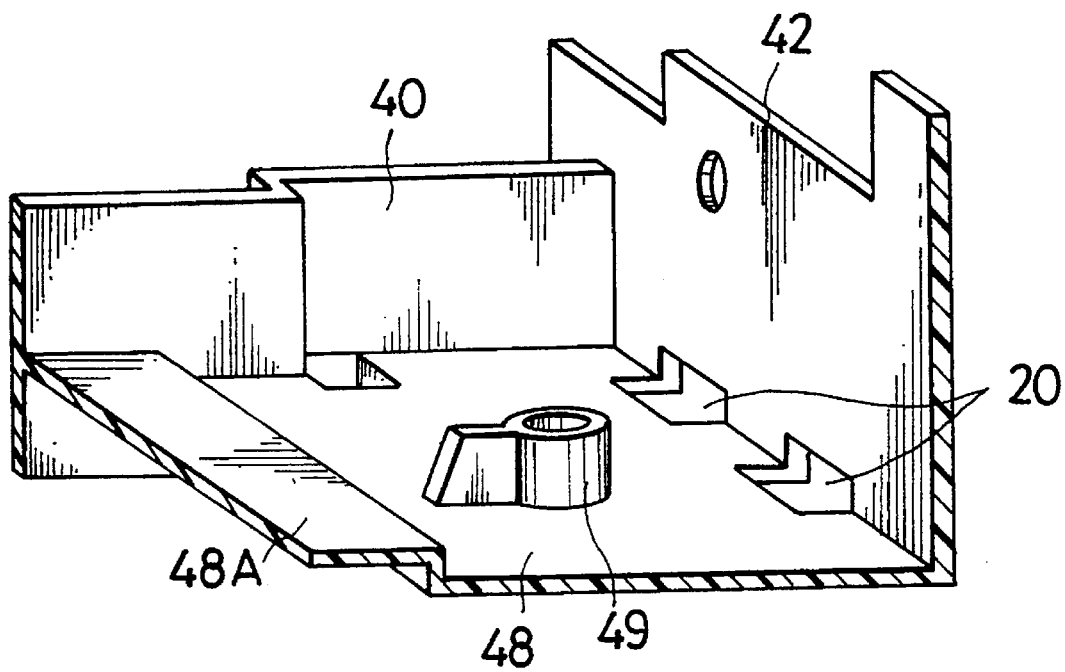
FIGS. 19A & 19B show an application of the molded article according to the first embodiment of the present invention to a box-shaped molded article (chassis of a copying machine).

A molded article according to the first embodiment of the present invention was applied to a chassis of a laser beam printer. The chassis is to have optical parts (prism, reflector, etc.) and a motor mounted thereon. A box-shaped molded article, a chassis, whose perspective view and partial cross section are shown in FIG. 19A, was produced by injection-molding a resin composition (trade name: Iupilon GS2050, supplied by Mitsubishi Gas Chemical Company, Inc.) prepared by blending 50 parts by weight of a polycarbonate resin and 50 parts by weight of a glass fiber according to a conventional method.

Figure 19B:
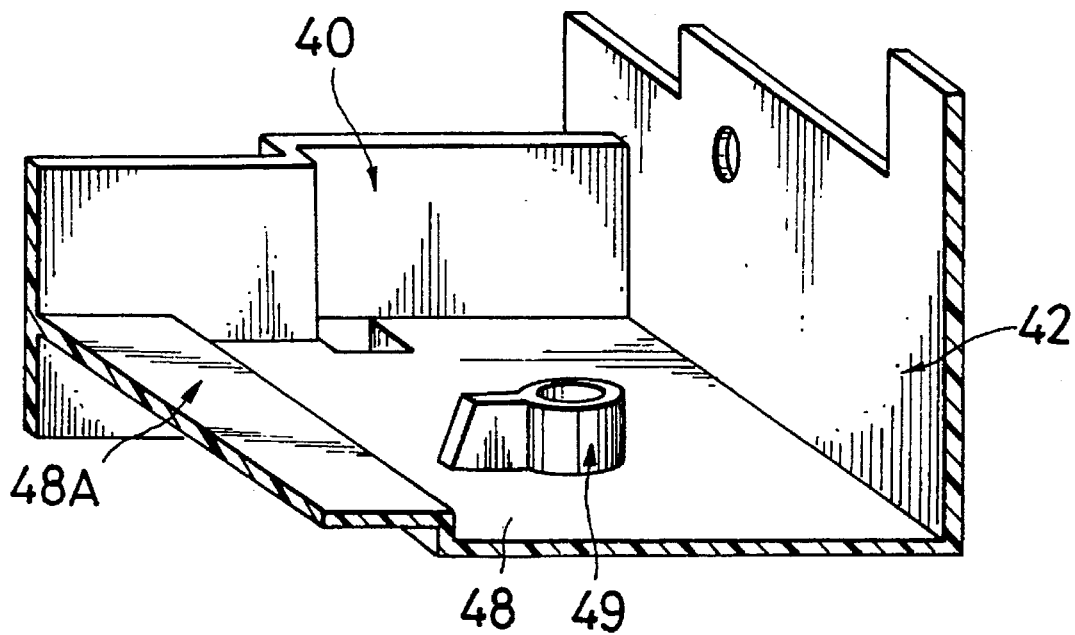

The above chassis had a plurality of side planes and bottom planes 48 and 48A. FIG. 19A shows two side planes 40 and 42 out of the four side planes. The side plane 40 had a length of 400 mm and a height of 60 mm. The side plane 42 had a length of 500 mm and three heights of 80 mm, 90 mm and 100 mm. The bottom plane 48A joined the side plane 40 at a position 25 mm high along the side plane 40. Each of the side planes 40 and 42 and the bottom planes 48 and 48A had a thickness of 4 mm. In FIG. 19, numeral 49 indicates a portion where the optical parts were to be installed.

In Example 3, opening portions 20 were formed to prevent warpage, and extend from the bottom plane 48 to the side plane 42. The opening portions 20 had a width of 20 mm, a depth of 20 mm along the bottom plane 48 and a height of 20 mm along the side plane 42. These two opening portions 20 shown in FIG. 19A were 20 mm apart from each other. Further, one of the opening portions 20 near a junction portion where the side plane 40 and the side plane 42 joined was 20 mm apart from the junction portion.

The above-produced chassis was to be mounted on a laser beam printer such that the side plane 42 and the bottom plane 48 were fitted on it. A chassis of this type is required to have high dimensional accuracy, smoothness and plane flatness so that optical parts installed thereon can fully exhibit their properties and that the chassis can be accurately and easily mounted in place in a housing of a laser beam printer. The chassis has many corners where two or three planes join, and warpage is liable to occur in the corners.

The side plane 42 of the chassis shown in FIG. 19A showed an inward warpage of 0.2 mm.

COMPARATIVE EXAMPLE 3

A chassis was produced in the same manner as in Example 3 except that no opening portions were formed. That side plane of this chassis which corresponded to the side plane 42 showed an inward warpage of 0.9 mm.

The above results of the warpage measurements show that the deformation of a box-shaped molded article, a chassis, can be effectively prevented by forming opening portions. Conventional chassis have showed large warpage, and it has therefore been difficult in many cases to install optical parts therein or install the chassis in a housing. However, the deformation of the chassis can be remarkably reduced by forming an opening portion in its plane(s). As a result, optical parts, a motor, etc., can be very easily installed on the chassis, and the optical parts can exhibit their properties. Further, the chassis can be remarkably easily installed in a housing of a copying machine.

EXAMPLE 4

A molded article according to the second embodiment of the present invention was applied to an automobile door mirror stay. A molded article (automobile door mirror stay) was produced by injection-molding a resin composition prepared by blending 45 parts by weight of poly-m-xylenediadipamide (Reny N252, supplied by Mitsubishi Gas Chemical Company, Inc.) and 55 parts by weight of a glass fiber according to a conventional method.

Figure 20A:
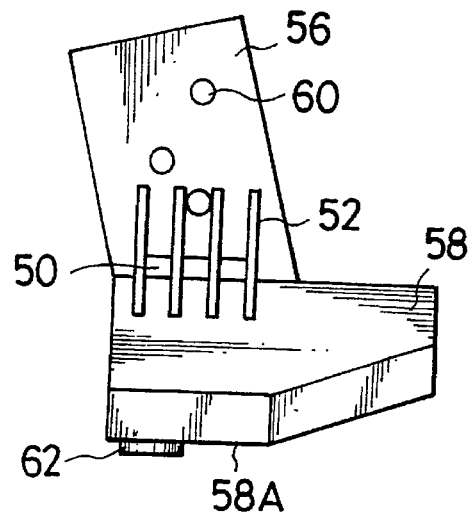
FIGS. 20A & 20B, 20C show an application of the molded article according to the first embodiment of the present invention to an automobile door mirror stay.
Figure 20B:
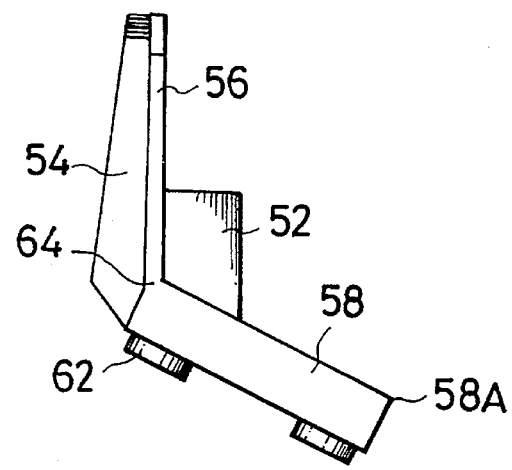
Figure 20C:
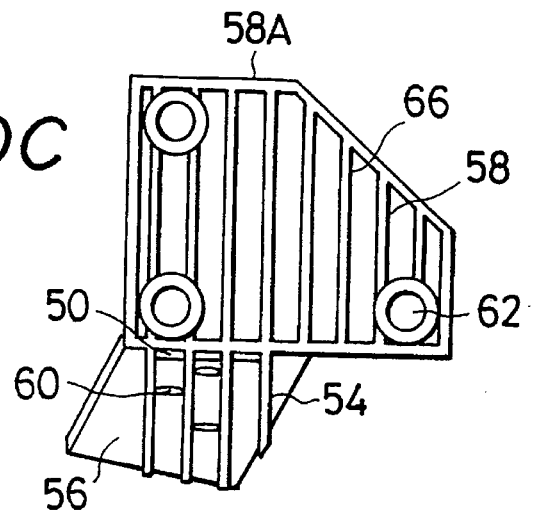

FIG. 20 schematically show the above-produced automobile door mirror stay. FIG. 20A is a front view of the automobile door mirror stay, FIG. 20B is its left side view, and FIG. 20C is its bottom view. In FIG. 20, numeral 50 indicates opening portions, numeral 52 indicates inner ribs (thickness: 2 mm), numeral 54 indicates outer ribs (thickness: 2 mm), numeral 56 indicate one plane (thickness: 3 mm) as a mirror fitting portion, numeral 58 indicates another plane (thickness: 3 mm) as a portion to be fixed to an automobile body, numeral 60 indicates holes for mirror fitting bolts, numeral 62 indicates holes through which bolts for fixing the stay to an automobile body are to be inserted, numeral 64 indicates a junction portion where one plane as the mirror fitting portion 56 and the other plane 58 as the portion to be fixed to an automobile body join each other, and numeral 66 indicates outer ribs formed on the portion 58 to be fixed to an automobile body.

As shown in the side view of FIG. 20B, the plane 58 as the mirror fitting portion and the other plane 58 as the portion to be fixed to an automobile body were to form an angle of 105 degrees (which was an angle expected from a mold cavity design, and the molded article was to show some deviation). As shown in the front view of FIG. 20A, the mirror fitting portion 56 jointed the portion 58 to be fixed to an automobile, in such a state that the mirror fitting portion 58 tilted leftward at an angle of 110 degrees from the portion 58. That is, the ribs and the one plane (mirror fitting portion 58) formed an angle of 80 degrees.

In FIG. 20A, the mirror fitting portion 56 had a maximum height of 80 mm when measured upwardly from the portion 58 to be fixed to an automobile. The portion 58 had a width of 100 mm when measured horizontally in this Figure. The smallest width of said portion 58 was 50 mm. In FIG. 20C, the pentagonal portion 58 to be fixed to an automobile body had heights of 80 mm and 40 mm when measured vertically in the Figure.

Each of the opening portions 50 was formed between the two neighboring members of the four inner ribs 52. As shown in FIG. 20A, each opening portion had a height (in the vertical direction) of 3 mm and a length (in the horizontal direction) of 10 mm. Each opening portion 50 did not extend so far as the junction portion 64 and the portion 58 to be fixed to an automobile body.

In FIG. 20A, the centers of the inner ribs 52 were positioned 5.75 mm, 15.75 mm, 25.75 mm and 35.75 mm apart from the left end of the portion 58 to be fixed to an automobile body. In FIG. 20B, each inner rib 52 had a width (in horizontal direction) of 25 mm and a height, on the right side, of 30 mm.

As shown in FIG. 20C, the outer ribs 66 on the portion 58 to be fixed to an automobile body were positioned at equal intervals of 12 mm, and the most leftward one was positioned 8 mm apart from the left end of the portion 58. The number of the outer ribs 66 was eight. In FIG. 20B, the outer ribs 54 on the mirror fitting portion 56 had a smallest width of 4 mm and a largest width of 6 mm.

The outer ribs 66 on the portion 58 to be fixed to an automobile body had a height of 6 mm. Some of the outer ribs 66 on said portion 58 and the outer ribs 54 on the mirror fitting portion 56 were integrally formed.

As shown in FIG. 20, an automobile door mirror stay has a form in which two planes (mirror fitting portion 56 and the portion 58 to be fixed to an automobile body) join each other in the junction portion 64, and a number of parts are installed on the automobile door mirror stay. Therefore, the tolerance deformation such as warpage and bending for the molded article is very small.

The above-produced automobile door mirror stay was measured for warpage. As shown in the left side view of FIG. 20B, the warpage was expressed by an angle formed by the portion 58 to be fixed to an automobile body and the mirror fitting portion 56 with the junction portion as a center. The angle found was 104.9 degrees when the designed angle was 105 degrees.

COMPARATIVE EXAMPLE 4-A

Figure 21A:
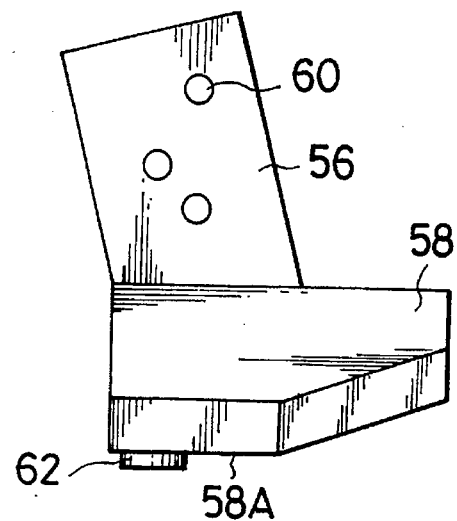
FIGS. 21A, 21B, 21C show a molded article (automobile door mirror stay) prepared in a Comparative Example 4-A.
Figure 21B:
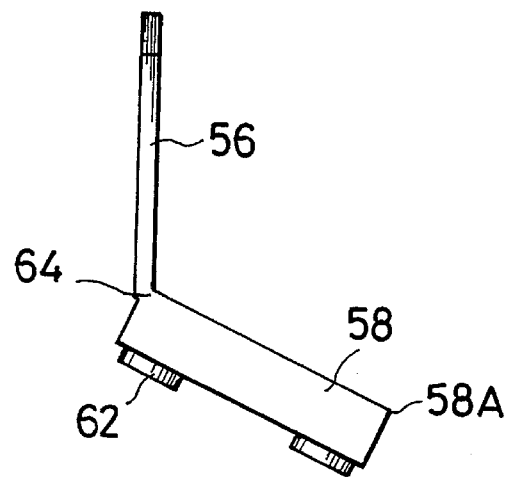
Figure 21C:
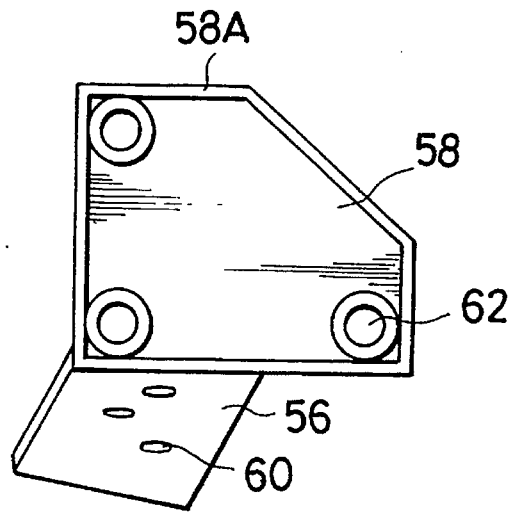

An automobile door mirror stay was produced from the same resin composition as that used in Example 4 by an injection molding method in the same manner as in Example 4, except that no opening portions and no ribs were formed. FIG. 21A shows a front view of the automobile door mirror stay, FIG. 21B shows its left side view and FIG. 21C shows its bottom view. This automobile door mirror stay was measured for warpage in the same manner as in Example 4 to show 103.9 degrees.

COMPARATIVE EXAMPLE 4-B

A molded article was produced from the same resin composition as that used in Example 4 in the same manner as in Comparative Example 4-A except that the radius of curvature (outer diameter) of its junction portion was increased to 10 mm so that the shrinkage stress and strain decreased in the molding time. The resultant molded article was measured for warpage in the same manner as in Example 4 to show 104.1 degrees. That is, the molded article in this Comparative Example 4-B showed an improved warpage value over the molded article in Comparative Example 4-A. However, it was not so improved in warpage as the molded article in Example 4.

COMPARATIVE EXAMPLE 4-C

An automobile door mirror stay as shown in FIG. 20 was produced from the same resin composition as that used in Example 4 in the same manner as in Example 4 except that no opening portions were formed. That is, this automobile door mirror stay differed from that produced in Comparative Example 4-A in that this automobile door mirror stay had ribs. The so-produced automobile door mirror stay was measured for warpage to show 104.4 degrees. That is, the molded article in this Comparative Example 4-C showed an improved warpage value over the molded article in Comparative Example 4-B. However, it was not so improved in warpage as the molded article in Example 4.

The above results show that an automobile door mirror stay to which a molded article according to the second embodiment of the present invention is applied has remarkably improved form accuracy over conventional ones, and is remarkably improved in fitting parts such as a motor and a mirror.

EXAMPLE 5

A molded article according to the second embodiment of the present invention was applied to a box-shaped molded article used as a printer housing. A printer housing was produced by injection-molding a resin composition prepared by blending 80 parts by weight of a polycarbonate resin (trade name: Iupilon GS2020, supplied by Mitsubishi Gas Chemical Company, Inc.) and 20 parts by weight of a glass fiber according to a conventional method.

Figure 22A:
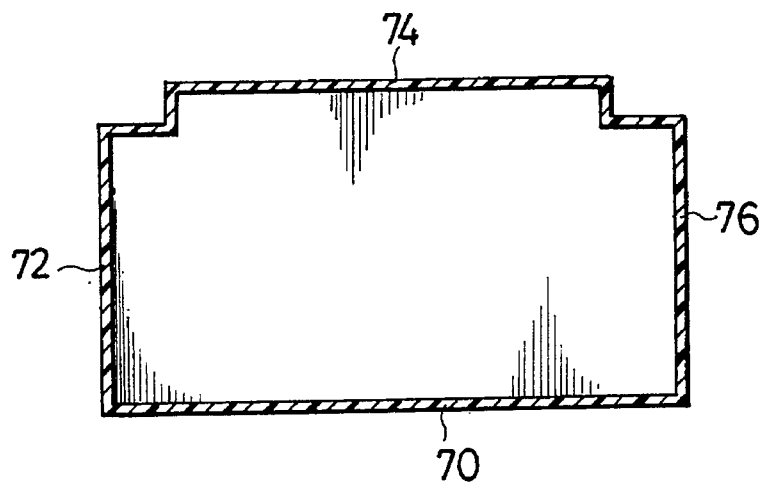
FIGS. 22A, 22B, 22C shows an application of the molded article according to the second embodiment of the present invention to a box-shaped molded article (printer housing).

FIG. 22A shows a cross-sectional view of the above-produced printer housing, taken at a height of ¾ of the overall height. In the printer housing, a first plane 70 had a length of 800 mm, a second plane 72 and a fourth plane 76 had a length of 400 mm, a third plane 74 had a length of 660 mm, the thickness of each plane had a thickness of 6 mm, and each plane had a height of 70 mm. An L-letter-shaped concave portion having a size of 70 mm×50 mm was formed in each of a corner formed by the second plane 72 and the third plane 74 and a corner formed by the fourth plane 76 and the third plane 74.

Figure 22B:
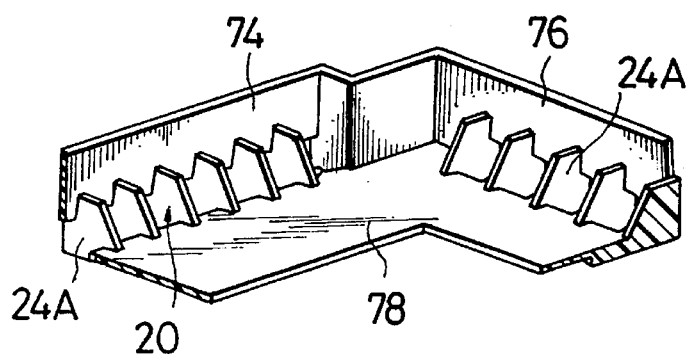
Figure 22C:
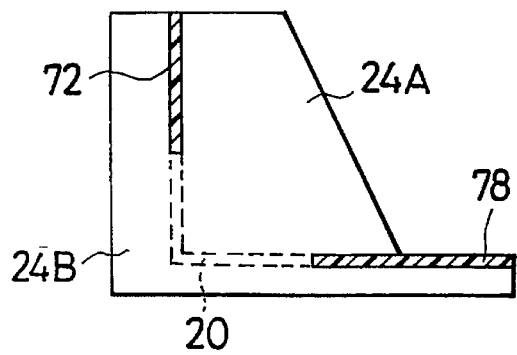

As shown in a perspective view of part of the molded article in FIG. 22B, each rib (thickness 2 mm) was formed, for example, in such a manner that an inner rib 24A and an outer rib 24B were integrally formed. That is, the ribs were formed inside and outside the side plane 70 and a bottom plane 78, inside and outside the side plane 72 and the bottom plane 78, inside and outside the side plane 74 and the bottom plane 78, and inside and outside the side plane 76 and the bottom plane 78. The ribs had a form shown in a side view of FIG. 22C. In the side view of FIG. 22C, the corner in the left bottom of the outer rib 24B had a right angle, the height on the left side was 30 mm, the length of the bottom side was 40 mm, the length on the upper side was 20 mm, the height on the right side was 8 mm, and the length of a horizontal portion toward the right end was 14 mm.

Each of opening portions 20 was formed between the two neighboring members of the ribs 24A and 24B. Each opening portion 20 extended from an in-plane area of one plane (bottom plane) to an in-plane area of the other plane (first, second, third or fourth plane). The opening portion 20, shown by a dotted line for the sake of convenience in FIG. 22C had a height of 20 mm and a width of 18 mm.

The first plane had 39 ribs, each of the second and fourth planes had 19 ribs, and the third plane had 19 ribs. These ribs were formed at equal intervals.

The molded article was measured for a maximum distance between a top portion of the third plane and an imaginary line from one top end portion of the third plane to the other top end portion thereof, and this maximum distance was taken as warpage. The warpage was 2.0 mm in the inward direction.

COMPARATIVE EXAMPLE 5-A

Figure 23:
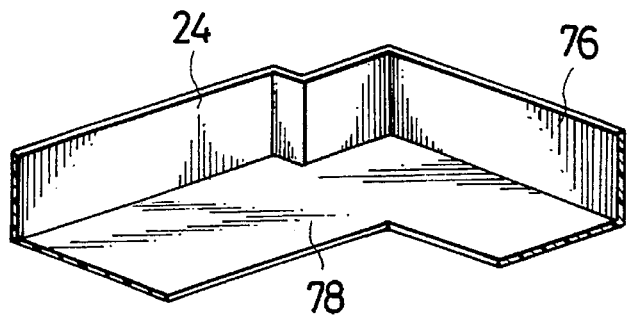
FIG. 23 shows a molded article (printer housing) prepared in a Comparative Example 5-A.

A printer housing was produced by injection-molding the same resin composition as that used in Example 5 in the same manner as in Example 5 except that no opening portions and no ribs were formed (see a perspective view in FIG. 23). This molded article showed an inward warpage of 4.5 mm.

COMPARATIVE EXAMPLE 5-B

A molded article was produced by injection-molding the same resin composition as that used in Example 5 in the same manner as in Comparative Example 5-A except that the radius of curvature (outer diameter) of its junction portions was increased to 10 mm so that the shrinkage stress and strain in the junction portions (where the first, second, third and fourth planes respectively joined the bottom plane) decreased in the molding time. The resultant molded article was measured for warpage in the same manner as in Example 5 to show 4.0 mm in the inward direction.

COMPARATIVE EXAMPLE 5-C

A printer housing was produced by injection-molding the same resin composition as that used in Example 5 in the same manner as in Example 5 except that no opening portions were formed. That is, the same ribs as those in Example 5 were formed outside and inside each plane. This molded article showed a warpage of 3.5 mm in the inward direction.

A printer housing is a box-shaped molded article, and one of its big problems is warpage. Since a number of parts are mounted on the printer housing, the tolerance of the deformation such as warpage and bending for the printer housing is very small. According to the second embodiment of the present invention, the deformation can be remarkably reduced by forming an opening portion and a rib. Therefore, the printer housing according to the second embodiment of the present invention can be remarkably improved in form accuracy as compared with conventional ones, and as a result, a motor, a gear, an IC-mounted printed circuit board, etc., can be remarkably easily installed.

EXAMPLE 6

A molded article according to the third embodiment of the present invention was applied to a box-shaped molded article used as an IC box for a machine tool. This IC box has a box-like form as shown in a perspective view of FIG. 24A, and an IC-mounted printed circuit board, other circuit boards, etc., can be placed therein.

Figure 24A:
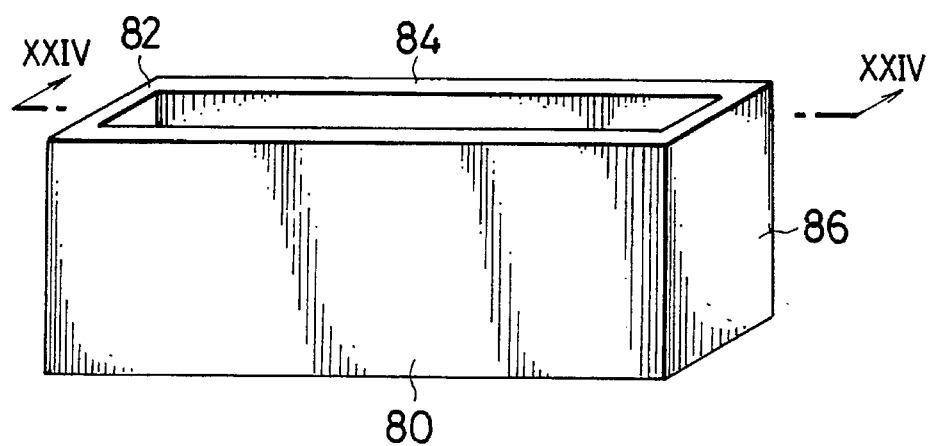
FIGS. 24A, 24B show an application of the molded article according to the third embodiment of the present invention to a box-shaped molded article (IC box for use in a machine tool).
Figure 24B:
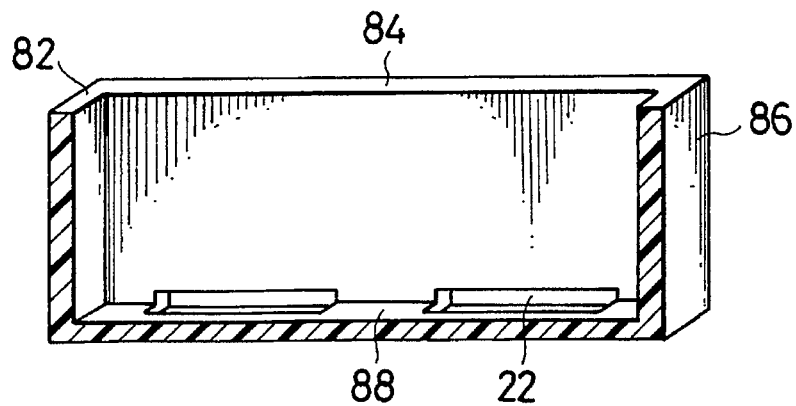

An IC box for a machine tool was produced from polypropylene (trade name: Mitsubishi Noblen MA3, supplied by Mitsubishi Petrochemical Co., Ltd.) according to a conventional method. The IC box as shown in the perspective view of FIG. 24A had a length of 120 mm, a width of 30 mm and a height of 50 mm. The thickness of each plane (excluding a thin wall portion) was 4 mm. FIG. 24B shows a cross-sectional view of the IC box, taken along a line XXIV—XXIV in FIG. 24A. The IC box for a machine tool had a bottom plane 88 and four side planes 80, 82, 84 and 86. In FIG. 24, numeral 80 indicates a front plane, numerals 82 and 86 indicate side planes, numeral 84 indicates a back plane, and numeral 88 indicates a bottom plane.

Two thin wall portions 22 (see FIG. 24B) were formed in each of a junction portion where one plane (bottom plane 88) and the other plane (front plane 80) joined and a junction portion where one plane (bottom plane 88) and the other plane (back plane 84) joined. For example, the center of one of the thin wall portions 22 was positioned 32 mm apart from the left end of the front plane 80, and the center of another of the thin wall portions 22 was positioned 86 mm apart from the left end of the front plane 80. Each thin wall portion 22 was obtained by forming a concave portion in the inner surface of each plane. The concavity of the thin wall portions 22 had a width 40 mm, a depth of 8 mm and a height of 8 mm. The thickness of each thin wall portion was 1.5 mm. For example, the outer surface of the front plane constituted the outer surface of the thin wall portion on the front plane.

The box-shaped molded article (IC box for a machine tool) was measured for a maximum distance between a top portion of the back plane 84 and an imaginary line from the top left end portion of the back plane 84 to the top right end portion thereof, and this maximum distance was taken as warpage. The warpage was 1.2 mm in the inward direction.

COMPARATIVE EXAMPLE 6

An IC box for a machine tool was produced in the same manner as in Example 6 except that no thin wall portions were formed. This IC box for a machine tool had the same dimensions as those of the IC box produced in Example 6. The so-produced molded article showed a warpage of 3.0 mm.

In a conventional IC box for a machine tool which is a box-shaped molded article, the front, back and side planes show inward warpage, and as a result, the installation of an IC-mounted printed circuit board and a variety of other circuit boards is made complicated. The molded article of the present invention shows reduced warpage, and an IC-mounted printed circuit board and other circuit boards can be easily installed.

EXAMPLE 7

A molded article according to the fourth embodiment of the present invention was applied to a printer housing, a box-shaped molded article. A printer housing was produced by injection-molding a resin composition prepared by blending 80 parts by weight of a polycarbonate resin (trade name: Iupilon GS2020, supplied by Mitsubishi Gas Chemical Company, Inc.) and 20 parts by weight of a glass fiber according to a conventional method. The so-produced printer housing had the same dimensions as those of the printer housing produced in Example 5 (see FIG. 22A). Further, this printer housing had ribs formed in the same manner as in Example 5 (see FIG. 22C). The first plane had 12 ribs, each of the second and fourth planes had 10 ribs, and the third plane had 8 ribs. These ribs were positioned at equal intervals. Each plane had a thickness of 6 mm.

Figure 25A:
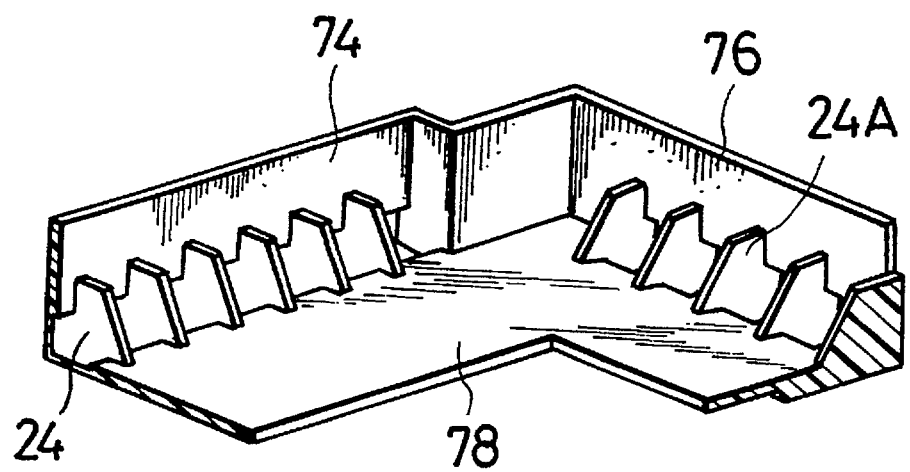
FIGS. 25A, 25B show an application of the molded article according to the fourth embodiment of the present invention to a box-shaped molded article (printer housing).
Figure 25B:
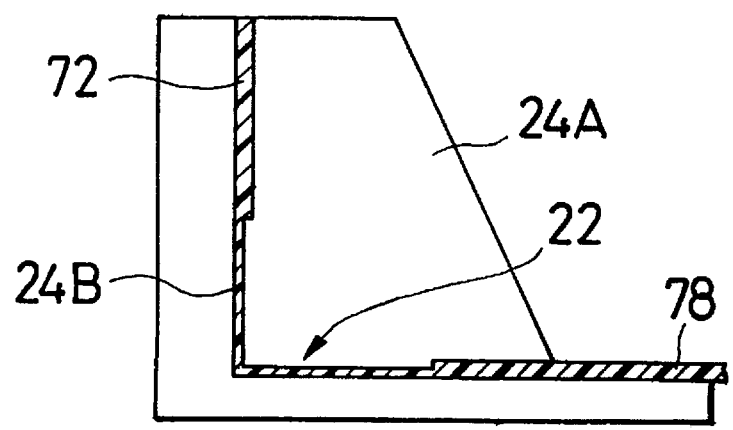

As shown in a perspective view of part of the molded article in FIG. 25A, each of thin wall portions 22 was formed between the two neighboring members of the ribs. The concavity of each thin wall portion had a height of 20 mm and a width of 30 mm. The thin wall portions 22 extended from an in-plane area of one plane (bottom plane 78) to an in-plane area of each of the other planes (first, second, third and fourth planes). Each thin wall portion 22 was obtained by forming a concave portion in the inner surface of each plane. The thin wall portions 22 had a thickness of 2.0 mm. For example, the outer surface of the first plane constituted the outer surface of the thin wall portion on the first plane.

The box-shaped molded article (printer housing) was measured for a maximum distance between a top portion of the third plane and an imaginary line from the top left end portion of the third plane to the top right end portion thereof, and this maximum distance was taken as warpage. The warpage was 1.2 mm in the inward direction.

COMPARATIVE EXAMPLE 7-A

A molded article (printer housing) was produced from the same resin composition as that used in Example 7 in the same manner as in Example 7 except that no thin wall portions and no ribs were formed (see the perspective view of FIG. 23). The molded article had the same dimensions as those of the molded article produced in Example 7. The warpage of this molded article was 5.5 mm in the inward direction.

COMPARATIVE EXAMPLE 7-B

A molded article was produced from the same resin composition as that used in Example 7 in the same manner as in Comparative Example 7 except that the radius of curvature (outer diameter) of its junction portions was increased to 10 mm so that the shrinkage stress and strain in the junction portions (where the first, second, third and fourth planes respectively joined the bottom plane) decreased in the molding time. The resultant molded article was measured for warpage in the same manner as in Example 7 to show 3.5 mm in the inward direction.

COMPARATIVE EXAMPLE 7-C

A printer housing was produced by injection-molding the same resin composition as that used in Example 7 in the same manner as in Example 7 except that no opening portions were formed. That is, ribs were formed inside and outside each plane in the same manner as in Example 7. The molded article was measured for warpage to show 3.1 mm in the inward direction.

As described above, when the molded article according to the fourth embodiment of the present invention was applied to a printer housing, the warpage was greatly reduced.

The molded articles of the present invention have been explained by reference to preferred embodiments. However, the present invention shall not be limited to these preferred embodiments alone.

The molded article of the present invention shall not be limited to the molded articles described in Examples, and it can be any molded article. The raw material, the form and dimensions of a molded article, the forms, dimensions and positions of an opening portion and a thin wall portion, the form, dimensions and position of a rib, and other conditions can be properly adjusted depending upon a variety of performances and specifications.

The two planes may be the same or different in thickness. The plane shall not be limited to a flat plane, and it may have a curved surface or an uneven surface. The plane may be constituted in any form, and it may be in a honeycomb form. When a thin wall portion extends from an in-plane area of one plane to an in-plane area of the other plane, the thickness of the thin wall portion on one plane and the thickness of the thin wall portion on the other plane may be the same or different.

The molded articles as embodiments according to the present invention show a great decrease in deformation such as warpage and bending as compared with conventional molded articles. The molded articles as embodiments according to the present invention can show a great decrease in warpage even if they are produced from raw materials showing a great property change in molding (raw materials having a high shrinkage factor in molding). Therefore, a variety of molded article required to have high dimensional accuracy can be supplied to a variety of industrial fields at a low cost.

What is claimed is:

1. An automobile door mirror stay, comprising a one-piece molded thermoplastic or thermosetting resin body comprising a mirror fitting portion defining one plane, an automobile body fixing portion defining another plane, each said plane having an in-plane area, a junction portion joining said mirror fitting portion and said automobile body fixing portion with each other, and ribs integrally molded as one piece with said mirror fitting portion and said automobile body fixing portion extending from said in-plane area of the one said plane, through said junction portion and to said in-plane area of the other said plane, wherein at least one of said mirror fitting portion and said automobile body fixing portion defining one of said planes has an opening portion therein, said opening portion defining a means for preventing angular deformation between said two planes from a desired angle between said two planes when said one-piece body is molded by minimizing differences in the cooling rate at different parts of said one-piece body adjacent to said junction portion, and said opening portion being located between said ribs at least adjacent to and along said junction portion, said opening portion having a length along said junction portion at least 5/10 the length of said junction portion.

2. The automobile door mirror stay according to claim 1, wherein said opening portion has a length coinciding with a distance in the clear between said ribs.

3. An automobile door mirror stay made by the process of:

molding a material selected from the group consisting of a thermoplastic resin and a thermosetting resin in a cavity mold, the cavity mold having a mold cavity with cavity wall surfaces for forming a mirror fitting portion and an automobile body fixing portion joined at an angle, so as to produce a one-piece molded thermoplastic or thermosetting resin body comprising a mirror fitting portion defining one plane, an automobile body fixing portion defining another plane, each said plane having an in-plane area, a junction portion joining said mirror fitting portion and said automobile body fixing portion with each other, and ribs integrally molded as one piece with said mirror fitting portion and said automobile body fixing portion extending from said in-plane area of the one said plane, through said junction portion and to said in-plane area of the other said plane, wherein at least one of said mirror fitting portion and said automobile body fixing portion defining one of said planes has an opening portion therein located between said ribs at least adjacent to and along said junction portion, said opening portion having a length along said junction portion at least 5/10 the length of said junction portion; and cooling said one-piece molded thermoplastic or thermosetting resin body while minimizing differences in the cooling rate at different parts of said one-piece body, wherein said opening portion defines a means for preventing angular deformation of said resin body between said two planes from said angle by minimizing differences in the cooling rate at different parts of said one-piece body adjacent to said junction portion.

* * * * *